(12) United States Patent
Lee et al.

(10) Patent No.: US 6,422,608 B1
(45) Date of Patent: Jul. 23, 2002

(54) ANTI-ABRASION PIPE FITTINGS FOR HIGH-SPEED PARTICLE-LADEN FLOW

(75) Inventors: Heon Koo Lee; Jean Gean Han; Youn Je Kim; Byeong Je Na; Dong Won Kim; Dong Goo Kwon, all of Seoul; Jerng Dong Kim, Inchon, all of (KR)

(73) Assignee: Dong Lim Industrial Co., Ltd., Kyungki-do (KR)

( * ) Notice: Subject to any disclaimer, the term of this patent is extended or adjusted under 35 U.S.C. 154(b) by 0 days.

(21) Appl. No.: 09/530,705

(22) PCT Filed: Sep. 11, 1999

(86) PCT No.: PCT/KR99/00537

§ 371 (c)(1),
(2), (4) Date: May 4, 2000

(87) PCT Pub. No.: WO00/17562

PCT Pub. Date: Mar. 30, 2000

(30) Foreign Application Priority Data

Sep. 21, 1998 (KR) .............................................. 98-39018
Jul. 29, 1999 (KR) .............................................. 99-31097

(51) Int. Cl.⁷ ................................................. F16L 43/00
(52) U.S. Cl. ................. 285/179; 285/131.1; 285/132.1; 285/133.11
(58) Field of Search ............................. 285/179, 131.1, 285/132.1, 133.11

(56) References Cited

U.S. PATENT DOCUMENTS

| | | | | |
|---|---|---|---|---|
| 2,303,949 A | * | 12/1942 | Nordell | ........................ 285/179 |
| 2,837,810 A | * | 6/1958 | Ekholm | ........................ 285/101 |
| 3,654,008 A | * | 4/1972 | Rogers et al. | ............... 156/152 |
| 4,440,712 A | * | 4/1984 | Imgram | .................... 264/209.5 |
| 5,452,922 A | * | 9/1995 | Ziu | ............................. 285/179 |

FOREIGN PATENT DOCUMENTS

| | | | | | |
|---|---|---|---|---|---|
| DE | 0598919 A | * | 6/1934 | | .................. 285/179 |
| DE | 0601256 A | * | 8/1934 | | .................. 285/179 |
| EP | 0 195 528 A1 | | 9/1986 | | |
| GB | 0013962 A | * | 5/1894 | | .................. 285/179 |
| GB | 0184082 A | * | 8/1922 | | .................. 285/179 |
| JP | 4362394 | * | 12/1992 | | .................. 285/179 |
| WO | WO 97/19286 | | 5/1997 | | |
| WO | WO 98/15483 | | 4/1998 | | |
| WO | WO 98/15769 | | 4/1998 | | |

* cited by examiner

*Primary Examiner*—Lynne H. Browne
*Assistant Examiner*—Aaron Dunwoody
(74) *Attorney, Agent, or Firm*—Oliff & Berridge, PLC

(57) ABSTRACT

An anti-abrasion pipe fitting for high speed particle-laden flow is disclosed, which includes a plurality of flow fields such as a vortex flow field formed at a flow direction changing portion during a fluid feed by expanding an outer side curved portion and inner side curved portion of the flow direction changing portion to the outside of a standard flow range in an elbow shaped curved coupling pipe formed of an upper side straight portion, a lower side straight portion perpendicular to the upper side straight portion, and a flow direction changing portion formed between the upper side straight portion and the lower side straight portion, so that it is possible to prevent an abrasion at a portion in which a flow direction is changed without forming a protection film formed of an anti-abrasive material at an inner wall of a pipe for thereby increasing the life span of the system.

4 Claims, 37 Drawing Sheets

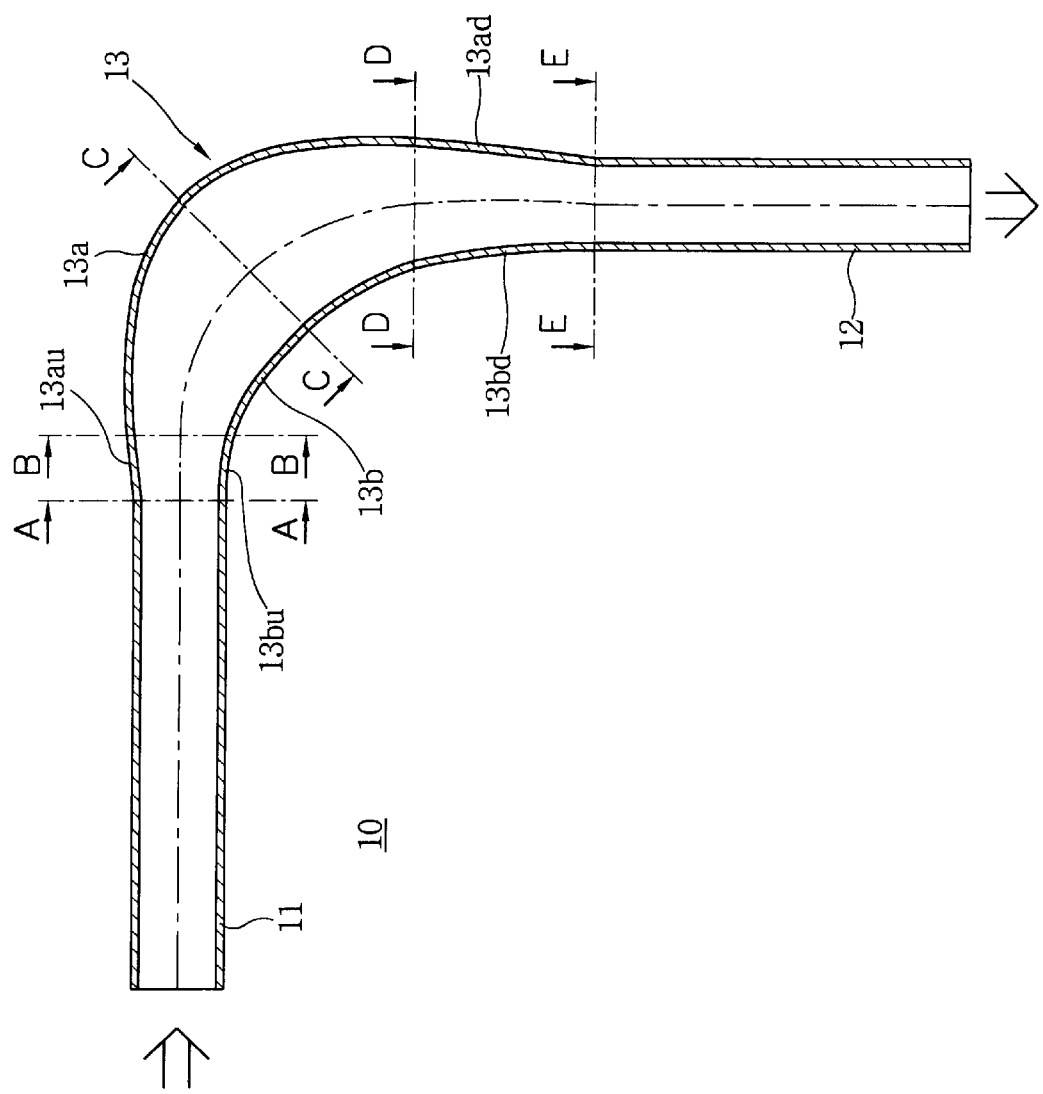

A-A

B-B

C-C

D-D

E-E

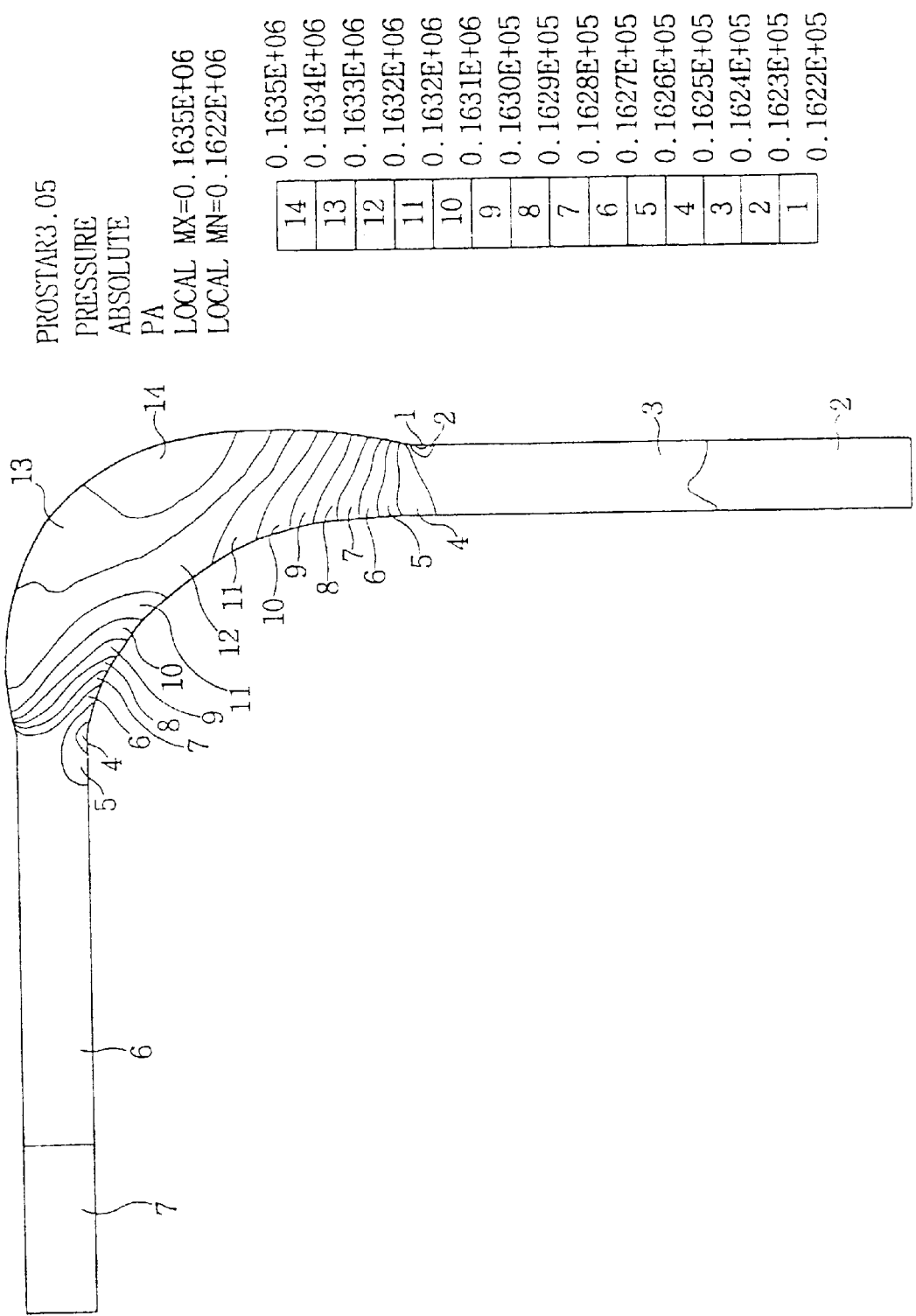

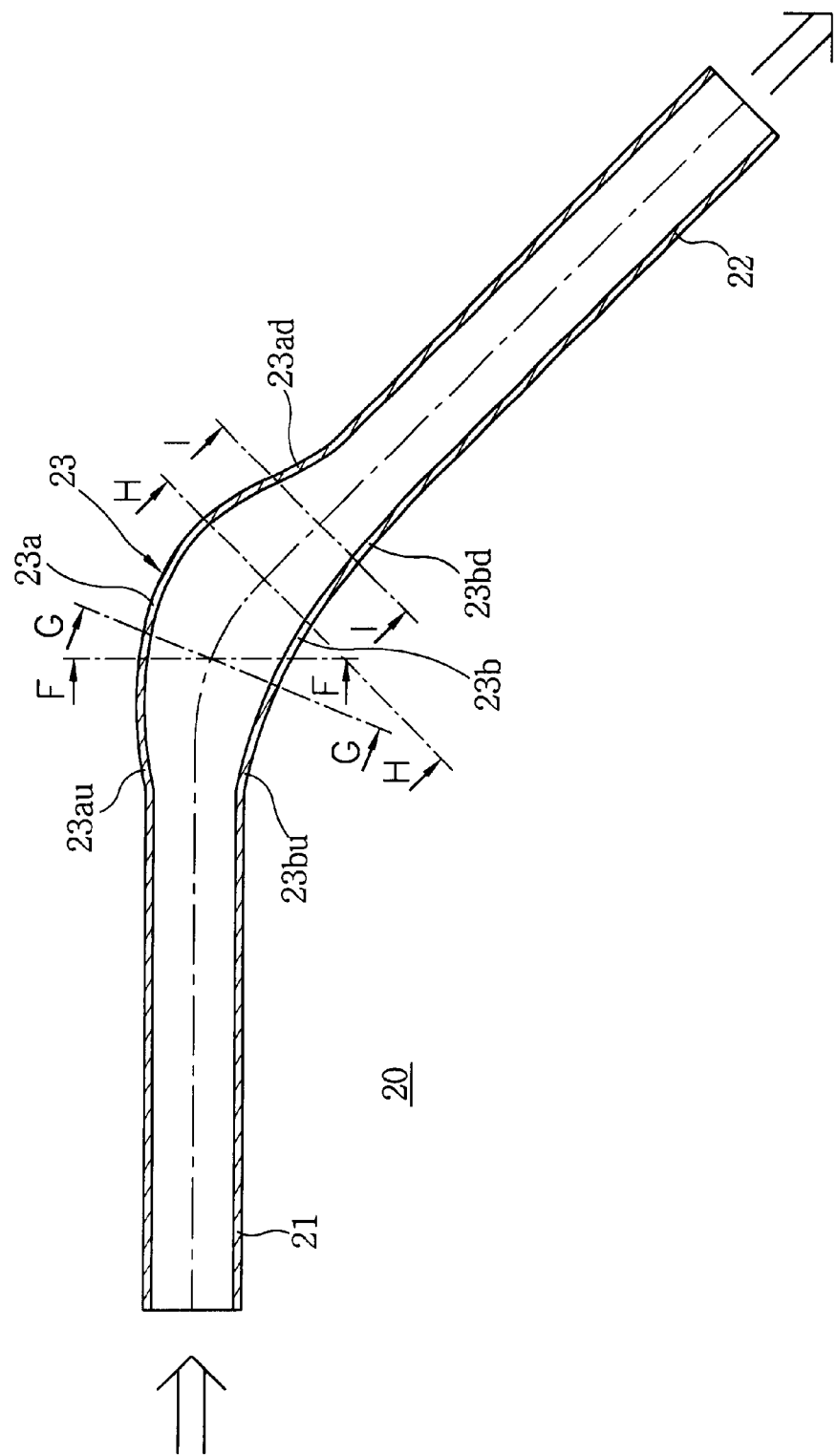

F—F

G—G

H—H

I—I

J—J

K—K

L—L

M—M

N—N

O—O

P—P

Q—Q

R—R

S-S

T-T

U-U

V-V

W-W

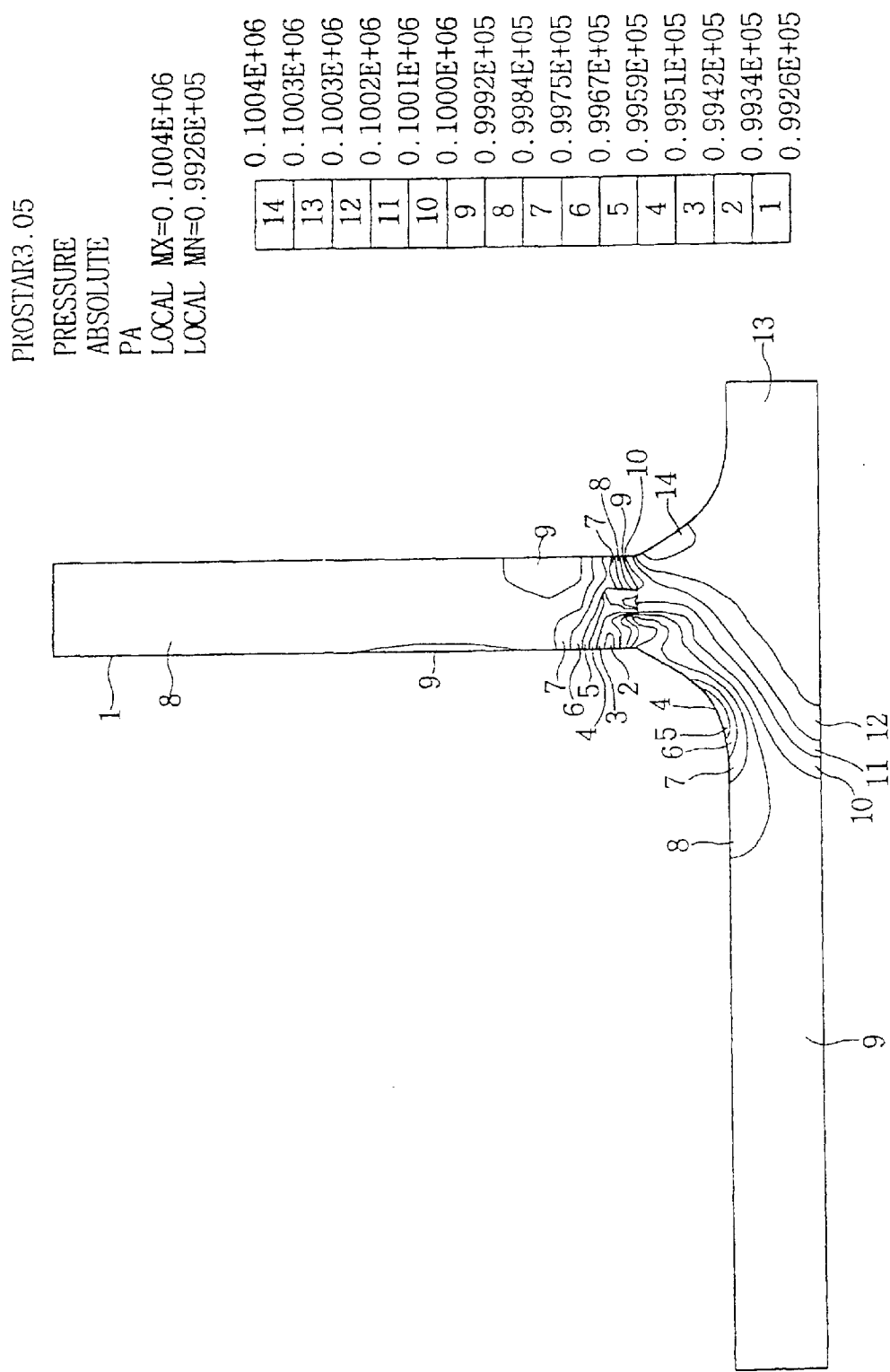

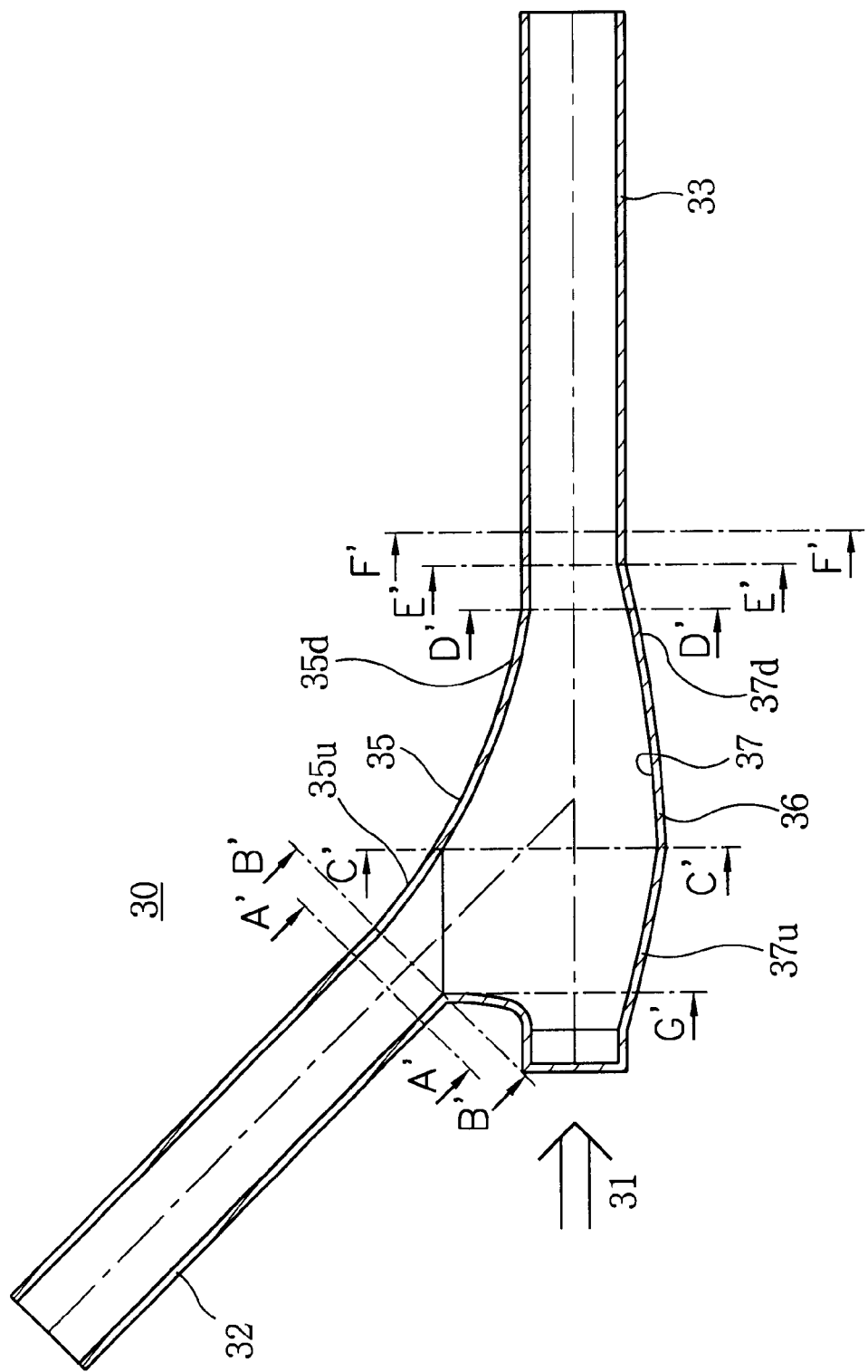

A'-A'

B'-B'

C'-C'

D'-D'

E'-E'

F'-F'

G'-G'

ANTI-ABRASION PIPE FITTINGS FOR HIGH-SPEED PARTICLE-LADEN FLOW

TECHNICAL FIELD

The present invention relates to an anti-abrasion pipe fitting for high-speed particle-laden flow.

BACKGROUND ART

Generally, a material feeding pipe is used for feeding a certain powder material such as fly ash, bottom ash, etc. in an industrial facility such as a fossils electric power plant, a steel fabrication factory, a cement fabrication factory, and the like. In these cases, as a feeding method, a wet feeding method is known for mixing water with a powder material in a slurry form and feeding the mixed slurry. As another feeding method, a dry feeding method is known for feeding a powder material using a mechanical force or pneumatic pressure.

In the wet feed method, since a certain material is fed based on its weight, a small amount of force is used, and a small abrasion occurs at an inner wall of a curved coupling pipe, so that its life span is increased. However, after the material is fed, the slurry is compressed by a filter press, etc. and is dehydrated. Namely, in this case, a process is additionally required, so that a related facility becomes bulky, and the area for installing the bulky system is increased. In particular, a polluted water containing heavy metals may be produced, so that an environment may be polluted during a cooling process.

In addition, in the dry feeding method, since a post-process is not required, the system may be simplified, and the fabrication cost is minimized. However, lots of power is required for feeding powder materials, and an abrasion is increased at an inner wall of a coupling pipe, so that a maintenance cost is increased.

In the case that a powder material containing a burned lime is mixed with water, the volume of the burned lime is sharply increased for thereby resulting in an explosion of the burned lime. Therefore, in this case, the dry feed method is generally used.

The conventional curved coupling pipe for a high speed powder material feed pipe will be explained.

FIG. 23 is a view illustrating a conventional 90 elbow 100 which includes an upper side straight portion 101, a lower side straight portion 102 which is perpendicular to the upper side straight portion 101, and a flow direction changing portion 103 connecting the upper side straight portion 101 and the lower side straight portion 102.

The upper side straight portion 101, the lower side straight portion 102, and the flow direction changing portion 103 have the same diameter. The center line C of the upper side straight portion 101 and the lower side straight portion 102 has a radius curvature of a ¼ circle.

The movement of the powder material in the conventional elbow 100 will be explained. At the center portion, the flow speed of the upper side straight portion 101 is fast, and is gradually decreased in the direction of the pipe inner wall. At the flow direction changing portion 103, the flow speed at the outer side curved portion 103a is fast, and the flow speed at the inner side curved portion 103b is slow, so that a high speed zone H is formed at an inner wall side of the outer side curved portion 103a, and a low speed zone L is formed at an inner wall side of the inner side curved portion 103b. At the lower side straight portion 102, the flow speed is fast at the center portion, and is decreased in the direction of the pipe inner wall side, so that the flowing amount and flow speed at the upper side straight portion 101 and the lower side straight portion 102 are same.

Here, assuming that the flow speed of the powder material at the upper side straight portion 101 is 35 m/sec(2100 m/min), the flow speed at the high speed zone H is 45 m/sec(2700/min), and the flow speed at the low speed zone L is 15~25 m/sec(900~1500/min).

Therefore, in the outer side curved portion 103a of the flow direction changing portion 103 of the elbow 100 having the high speed zone H, a collision of the powder materials which are linearly moved from the upper side straight portion 101 occurs. In addition, a great abrasion occurs due to a friction with the fed powder material and a decreased anti-abrasion due to a heat generated at an inner wall of the pipe.

The anti-abrasion occurs due to the heat generation at the inner wall of the pipe. In detail, the temperature of the powder material reaches about 80 C. When the above-described powder materials are fed, the inner wall of the powder material feed pipe is heated. In particular, the heat is generated due to the temperature of the powder material and a friction with the powder materials at the outer side curved portion 103a of the flow direction changing portion 103, so that the anti-abrasion characteristic of the pipe wall is decreased.

Next, the abrasion due to the collision and friction of the powder materials will be explained. Since a high speed zone H is formed at the outer side curved portion 103a of the flow direction changing portion 103, an abrasion due to a collision with the powder materials occurs.

Here, the degree that the flow speed and pressure at the high speed zone H of the powder materials fed in the high speed powder material feed pipe affects the abrasion will be compared with those of a grinding process.

The polishing speed(the sum of the circular speed of the grinding wheel and the relative moving speed of the grinding wheel and an object) of the grinding wheel used for the grinding process is 2200~3400 m/min, and the grinding pressure is 0.50~0.7 kg/cm$^2$, and the feeding amount of one time is maximum 5_ when the grinding process is performed using a cooling water. As a result, the MOS hardness of the powder material is 5.5~6.5. Assuming that the flow speed at the upper side straight portion 101 is 2100 m/min, since the flow speed at the high speed zone H is 2700 m/min, an abrasion is increased due to a collision and friction of the powder materials at the inner wall of the pipe at the high speed zone H.

In the case of the dry feed method, since water is not provided, the abrasion is increased compared to the grinding process in which a cooling water is provided.

In addition, since the abrasion at the outer side curved portion 103a of the flow direction changing portion 103 does not uniformly occur. Namely, as shown in FIG. 23, an erosion zone EZ is formed at the portion in which the abrasion occurs at an initial stage. The abrasion is performed at this portion as faster as the other portions by 2.0$^6$ times.

The frequent maintenance of the powder material feed pipe is required due to the above-described abrasion. In order to perform the maintenance, since the operation of the system is stopped, much economic loss occurs.

As shown in FIG. 24, the 45 elbow includes a lower side straight portion 202 which is formed at an angle of 45 with respect to the upper side straight portion 201 and the upper side straight portion 201, and a flow direction changing portion 203 connecting the upper side straight portion 201 and the lower side straight portion 202.

The above-described 45 elbow 200 includes a certain flow direction changing angle between the upper side straight portion 201 and the lower side straight portion 202 which is different from the 90 elbow 100 and includes a high speed zone H formed at the outer side curved portion 203a of the flow direction changing portion 203 and a low speed zone L formed at the inner side curved portion 203b. The abrasion is sharply increased at the high speed zone H by the above-described reasons.

As shown in FIG. 25, the T-shaped coupling pipe 300 includes a first upper side straight portion 301, a lower side straight portion 303 formed on the same axis as the first upper side straight portion 301, and a second upper side straight portion 302 which is perpendicular to the first upper side straight portions 301 and 303.

An upper side flow direction changing portion 304 is formed between the first upper side straight portion 301 and the second upper side straight portion 302. A lower side flow direction changing portion 305 is formed between the second upper side straight portion 302 and the lower side straight portion 303. A connection portion 306 is formed between the first upper side straight portion 302 and the lower side straight portion 303.

In the case of the T-shaped coupling pipe 300, an abrasion occurs at the lower side flow direction changing portion 305 due to a collision with the powder material which is fed at a high speed from the first upper side straight portion 301, and an abrasion occurs at the first upper side straight portion 301 and the lower side straight portion 303 by a collision with the powder materials which are fed at a high sped from the second upper side straight portion 302, so that the life span of the system is decreased.

As shown in FIG. 26, in the case of the Y-shaped coupling pipe 400, there are provided a first upper side straight portion 401, a lower side straight portion formed on the same axis as the first upper side straight portion 401, and a second upper side straight pipe 402 connected at an angle of 45 with respect to the first upper side straight portion 401 and the lower side straight portion 403.

An upper side flow direction changing portion 404 is formed between the first upper side straight portion 401 and the second upper side straight portion 402. A lower side flow direction changing portion 405 is formed between the second upper side straight portion 402 and the lower side straight portion 403. A connection portion 406 is formed between the first upper side straight portion 401 and the lower side straight portion 403.

The above-described Y-shaped coupling pipe 400 includes a certain connection angle of the second upper side straight portion 402 with respect to the first upper side straight portion 401 and the lower side straight portion 403 which is different compared to the above-described T-shaped coupling pipe 300. An abrasion occurs at the lower side flow direction changing portion 405 due to a collision with the powder materials which are fed at a high speed from the first upper side straight portion 401. An abrasion occurs at the first upper side straight portion 401 and the connection portion 406 of the lower side straight portion 403 due to a collision with the powder materials which are fed at a high speed from the second upper side straight portion 402, so that the life span of the system is decreased.

As shown in FIGS. 27 through 30, a protection film F formed of an anti-abrasive material, such as, an alumina, basalt, cemented carbide, etc. is lined on an inner wall of the pipe for thereby decreasing the abrasion.

However, even when the protection film F is lined, a high speed zone H is formed at a flow direction changing portion, etc, so that it is impossible to basically prevent the abrasion due to a collision with the powder materials. Since an expensive anti-abrasive material which is used for the protection film F is used, the fabrication cost is increased, and it is impossible to obtain a satisfactory effect due to a limit in the anti-abrasive characteristic.

In the case that particles of $Al_2O_3$, $SiO_2$, etc. having a MOS hardness of 5.5~6.5 are fed into the pipe of a diameter of 100~400 mm at a speed of 8~45 m/sec, the flow speed at a portion in which the flow direction is changed is increased by more than 1.2~1.5 times compared to the flow speed in the straight pipe. Therefore, even when the protection film F formed of an anti-abrasive material is lined, the protection film F is worn and loses a function as a protection film, so that it is impossible to actually use the protection film F.

In the conventional art, the curvature of the flow direction changing portion is designed to have a certain curvature which is 10 times the standard curvature radius, so that the flow direction changing portion becomes nearly straight for thereby effectively decreasing the abrasion at the flow direction changing portion.

However, in the above-described conventional curved coupling pipe, since the length of the pipe is increased, and the occupying area of the pipe is increased, it is impossible to effectively use the space of the system.

In the conventional curved coupling pipe, a pocket is formed at the outer side curved portion of the flow direction changing portion or at a portion in which a collision occurs, so that the powder materials collide with the powders at the pocket for thereby changing the flow direction and decreasing the abrasion.

However, at the above-described conventional fittings, as time is elapsed, the amount of the powders gathered at the pocket is increased, so that an effective standard pipe range is decreased for thereby causing a flow loss.

In the conventional art, the thickness of the standard pipe wall at the portion in which the powder collides with an outer curved portion of the flow direction changing is 10 times the standard pipe wall thickness. so that even when an abrasion occurs, it is possible to use the curved coupling pipe for long time.

However, in the above-described fittings, the cost of the materials is expensive, and as the depth of the erosion zone EZ is increased, a flow problem occurs.

The pipes which are capable of feeding the powders based on the pneumatic pressure and a pressurized gas/liquid have the above-described problems. In addition, the curved coupling pipe used for feeding gas or fluid at a high speed has the above-described problems.

DISCLOSURE OF THE INVENTION

Accordingly, it is an object of the present invention to provide an anti-abrasion pipe fitting for high-speed particle-laden fluid which is capable of preventing an abrasion at a portion in which a flow direction is changed without forming a protection film formed of an anti-abrasive material at an inner wall of a pipe for thereby increasing the life span of the system.

To achieve the above objects, there is provided an anti-abrasion pipe fitting for high-speed particle-laden flow according to the present invention which includes a plurality of flow fields such as a vortex flow field formed at a flow direction changing portion during a fluid feed by expanding an outer side curved portion and inner side curved portion of the flow direction changing portion to the outside of a standard flow range in an elbow shaped curved coupling pipe formed of an upper side straight portion, a lower side straight portion perpendicular to the upper side straight portion, and a flow direction changing portion formed between the upper side straight portion and the lower side straight portion.

An upper side curved portion is formed between the upper side straight portion and the flow direction changing portion, and a lower side curved portion is formed between the lower side straight portion and the flow direction changing portion.

To achieve the above objects, there is provided an anti-abrasion pipe fitting for high-speed particle-laden flow which includes a plurality of flow fields such as a vortex flow field formed at the flow direction changing portion during a fluid feed by forming the upper side flow direction changing portion based on the standard flow range and expanding the lower side flow direction changing portion to the outside of the standard flow range, wherein a T-shaped curved coupling pipe includes a first upper side straight portion, a lower side straight portion extended on the same axis with respect to the upper side straight portion, a second upper side straight portion formed at a certain angle with respect to the first upper side straight portion and lower side straight portion, an upper side flow direction changing portion formed between the first upper side straight portion and the second upper side straight portion, a lower side flow direction changing portion formed between the second upper side straight portion and the lower side straight portion, and a connection portion connecting the first upper side straight portion and the lower side straight portion.

A curved recess is formed on an inner surface of the portion connecting the first upper side straight portion and the lower side connection portion for thereby forming a plurality of flow fields such as a vortex flow field at the recess during a fluid feed.

To achieve the above objects, there is provided an anti-abrasion pipe fitting for high-speed particle-laden flow which includes a plurality of flow fields such as a vortex flow field formed at the flow direction changing portion during a fluid feed by forming the upper side flow direction changing portion based on the standard flow range and expanding the lower side flow direction changing portion to the outside of the standard flow range, wherein a Y-shaped curved coupling pipe includes a first upper side straight portion, a lower side straight portion extended on the same axis with respect to the upper side straight portion, a second upper side straight portion formed at a certain angle below 90 with respect to the first upper side straight portion and lower side straight portion, an upper side flow direction changing portion formed between the first upper side straight portion and the second upper side straight portion, a lower side flow direction changing portion formed between the second upper side straight portion and the lower side straight portion, and a connection portion connecting the first upper side straight portion and the lower side straight portion.

A curved recess is formed on an inner surface of the portion connecting the first upper side straight portion and the lower side connection portion, for thereby forming a vortex flow field during a fluid feed by expanding the diameter of the pipe.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 5A is a cross-sectional view illustrating a 90° elbow shaped coupling pipe according to a fifth embodiment of the present invention;

FIG. 7 is a view illustrating a pressure distribution according to a fifth embodiment of the present invention;

FIG. 8A is a cross-sectional view illustrating a 45° elbow shaped coupling pipe according to a sixth embodiment of the present invention;

FIG. 19 is a view illustrating a pressure distribution according to a ninth embodiment of the present invention;

FIG. 20A is a cross-sectional view illustrating a lateral T-shaped coupling pipe according to a tenth embodiment of the present invention;

MODES FOR CARRYING OUT THE INVENTION

The anti-abrasion pipe fitting for high speed particle-laden flow according to the present invention will be explained with reference to the accompanying drawings.

Figure 1:
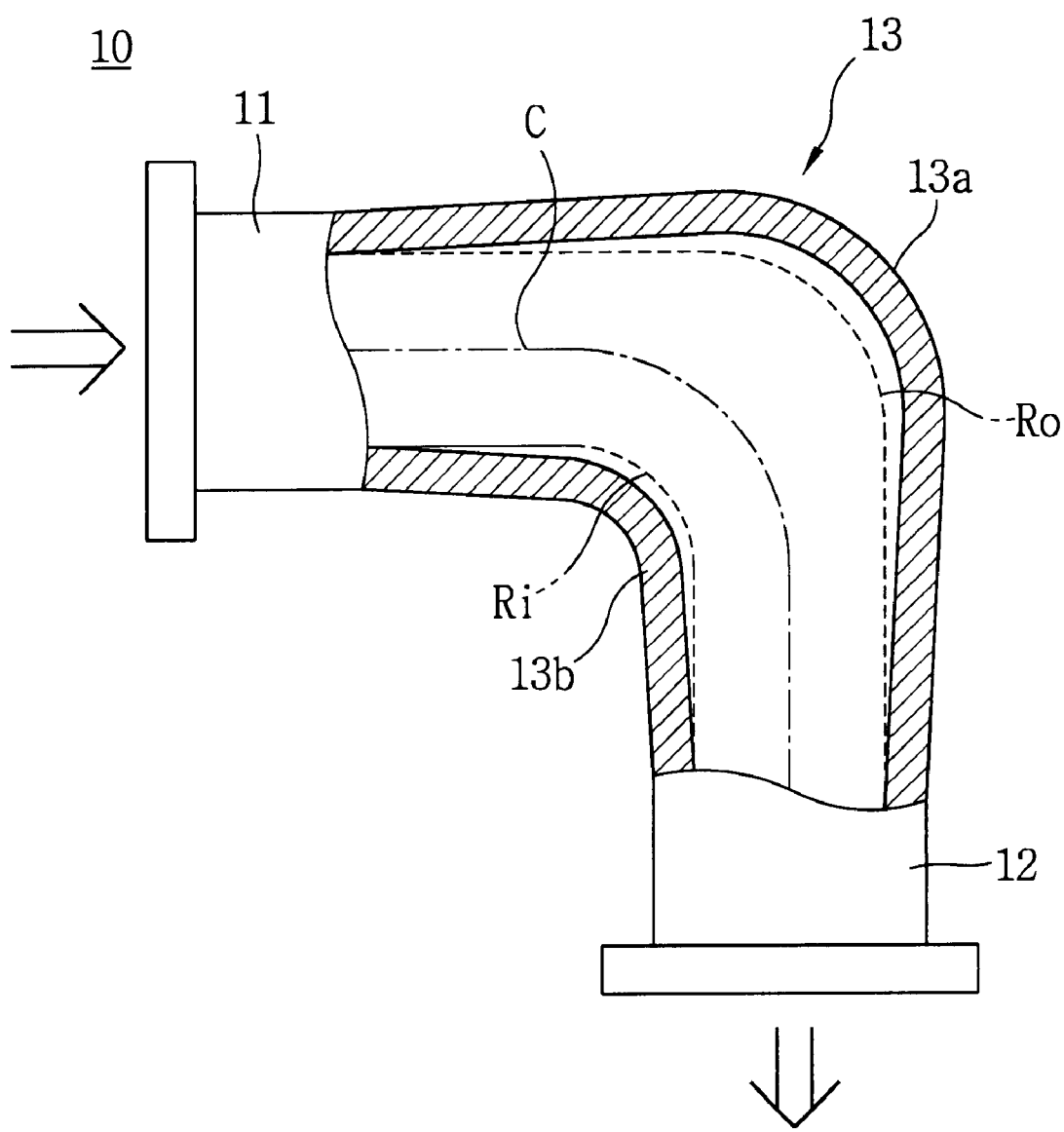
FIG. 1 is a cross-sectional view illustrating a 90 elbow shaped coupling pipe according to a first embodiment of the present invention.

FIG. 1 illustrates a first embodiment of the present invention adapting a 90 elbow which includes an upper side straight portion 11 extended in a first direction, a lower side straight portion 12 perpendicular to the upper side straight portion 11, and a flow direction changing portion 13 connecting the upper side straight portion 11 and the lower side straight portion 12.

The upper side straight portion 11 and the lower side straight portion 12 have the same inner diameters.

The center line C of the flow direction changing portion 13 has the standard curvature radius.

In the drawings, Ro and Ri represent the standard pipe ranges.

The outer side curved portion 13a and the inner side curved portion 13b of the flow direction changing portion 13 are expanded to the outside of the standard pipe ranges Ro and Ri.

The operation of the elbow type coupling pipe 10 according to the present invention will be explained.

When the elbow shaped coupling pipe 10 is adapted to a fluid feed pipe, since the upper side straight portion 11 has a constant inner diameter, the flow at the portion is similar to that of the conventional elbow shaped coupling pipe. Namely, the flow speed distribution at the upper side straight portion 11 is high at the center portion and is low at the lateral portion. When the fluid passed through the upper side straight portion 11 reaches the flow direction changing portion 13, the forwarding energy of the particles is decreased due to the increased cross-sectional area. At the outer side curved portion 13a and the inner side curved portion 13b which are expanded to the outside of the standard pipe ranges Ro and Ri, a flow field such as a vortex flow field is formed, and the flow speed is decreased compared to that of the center line C for thereby forming a stationary region, so that a collision energy of fluid with respect to the outer side curved portion 13a of the flow direction changing portion 13 is significantly decreased, and the abrasion of the outer side curved portion 13a and the inner side curved portion 13b is decreased.

The flow speed at the flow field such as the vortex flow field is low, and the pressure is high, so that the abrasion is affected by a flow speed, not by the pressure, for thereby significantly decreasing the abrasion.

In addition, the fluid forwarding from the upper side straight portion 11 to the outer side curved portion 13a is not directly collided with the inner wall of the outer side curved portion 13a but collided with a plurality of flow fields such as the vortex flow fields formed at the outer side curved portion 13a.

At this time, when the fluid flowing at the upper side straight portion 11 at a high speed collides with a plurality of flow fields, a collision is significantly decreased, and the fluid passes through the flow field based on the remaining collision energy and reaches the inner wall of the outer side curved portion 13a, since the collision energy is nearly used up during the flowing process, so that the inner wall of the outer side curved portion 13a is not worn.

The fluid moved to the lower side straight portion 12 via the flow direction changing portion 13 flows at a high speed at the center portion of the same and becomes slow at the inner wall sides of the pipe. The fluid flows at the lower side straight portion 12 based on the flow speed distribution which is similar at the upper side straight portion 11.

Figure 2:
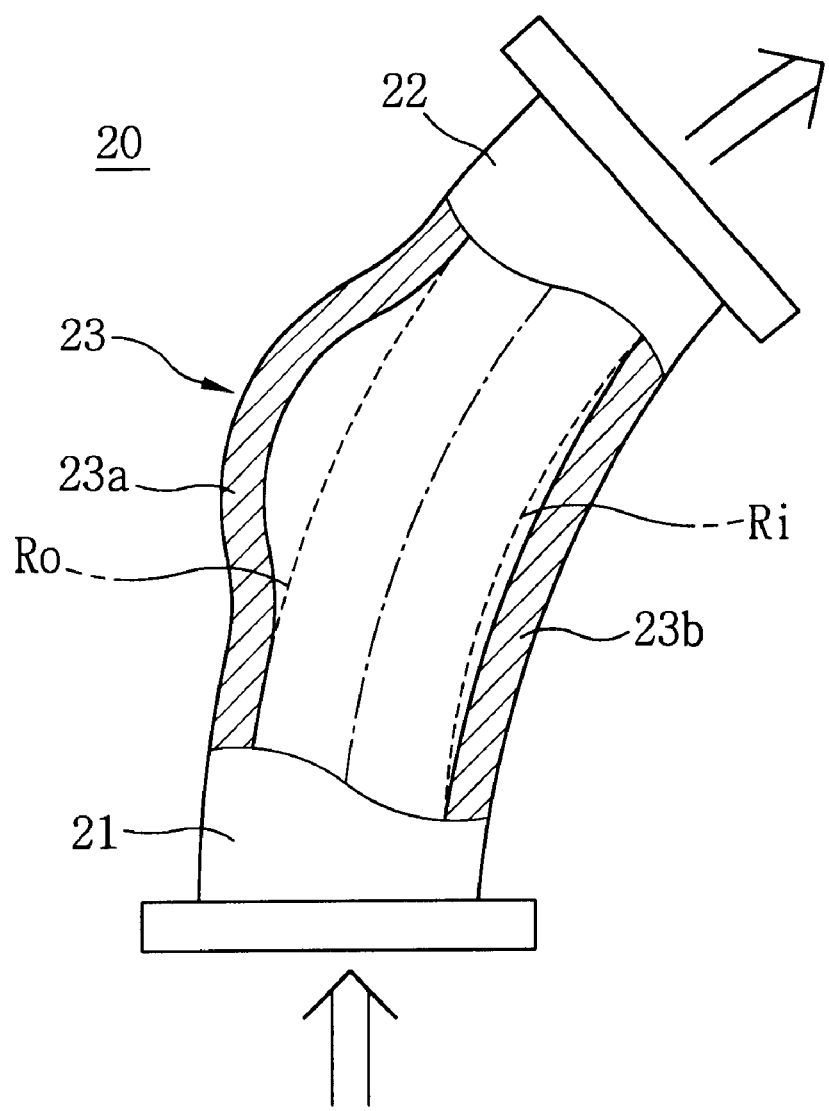
FIG. 2 is a cross-sectional view illustrating a 45 elbow shaped coupling pipe according to a second embodiment of the present invention.

FIG. 2 illustrates a second embodiment of the present invention adapted to the 45 elbow shaped coupling pipe 20 which includes an upper side straight portion 21, and a flow direction changing portion 23 connecting the upper side straight portion 21 and the lower side straight portion 22. The second embodiment of the present invention is similar to the first embodiment of the present invention except for that the flow direction changing angle between the upper side straight portion 21 and the lower side straight portion 22 is 45.

In FIG. 2, the reference numeral 23a represents an outer side curved portion, and 23b represents an inner side curved portion.

Figure 3:
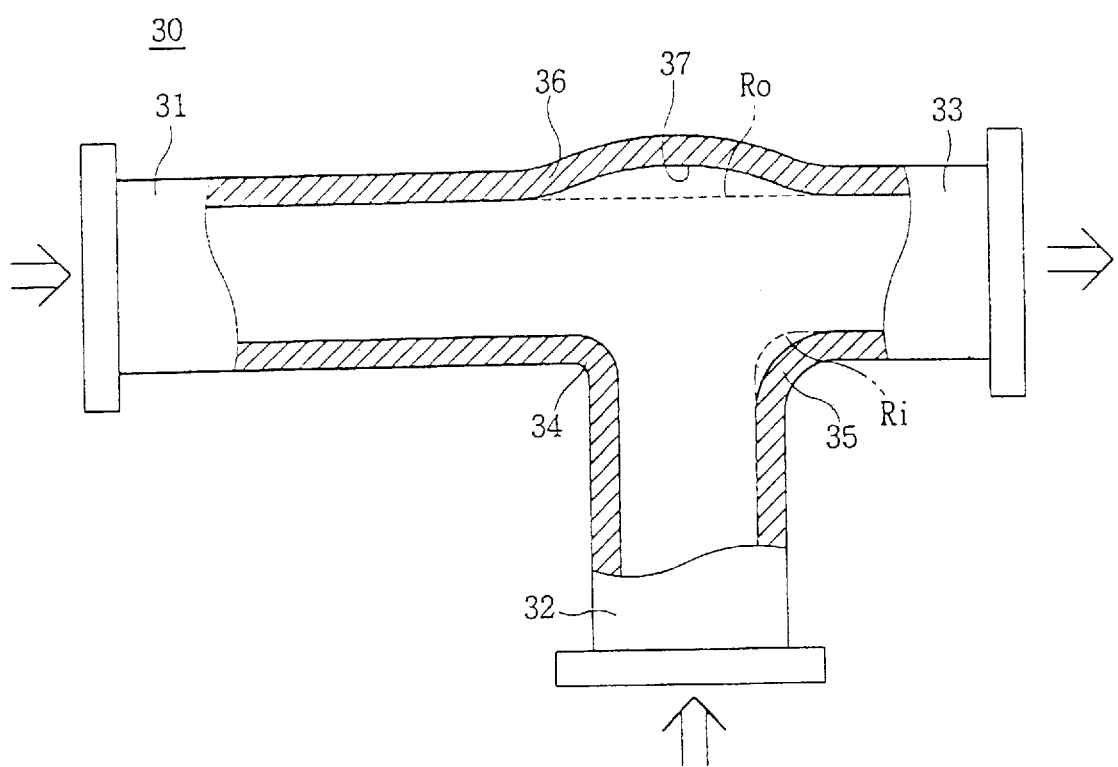
FIG. 3 is a cross-sectional view illustrating a T-shaped coupling pipe according to a third embodiment of the present invention.

FIG. 3 illustrates a third embodiment of the present invention which is adapted to the T-shaped coupling pipe 30 which includes a first upper side straight portion 31, a lower side straight portion 33 formed on the same axis as the first upper side straight portion 31, and a second upper side straight portion 32 perpendicular to the first upper side straight portion 31 and the lower side straight portion 33.

An upper side flow direction changing portion 34 is formed between the first upper side straight portion 31 and the second upper side straight portion 32, and a lower side flow direction changing portion 35 is formed between the second upper side straight portion 32 and the lower side straight portion 33, and a connection portion 36 is formed between the first upper side straight portion 31 and the lower side straight portion 33.

The upper side flow direction changing portion 34 is formed depending on the standard flow range Ri, and the lower side flow direction changing portion 35 is expanded toward the standard flow range Ri.

A curved recess 37 which is expanded to the outside of the standard flow range Ro around a portion encountered with an extended line of the second upper side straight portion 32 is formed at the connection portion 36, so that the diameter of the pipe is increased.

A curved recess 37 which is outwardly expanded to the outside of the standard flow range Ro around a portion encountered with an extended line of the second upper side straight portion 32 is formed at the connection portion 36, so that the diameter of the pipe is increased.

The operation of the T-shaped coupling pipe according to the present invention will be explained.

When the T-shaped coupling pipe 30 according to the present invention is adapted to the fluid feed pipe, since the first upper side straight portion 31 and the second upper side straight portion 32 have a constant inner diameter, the flow at the above-described portions is similar to that of the conventional elbow shaped coupling pipe, namely, is at the standard flow range.

The fluid which flows to the lower side straight portion 33 via the first upper side straight portion 31 forms a vortex flow field at the curved recess 37 of the connection portion 36, and the flowing speed is low at the curved recess 37, and the pressure is high.

The fluids which flow to the connection portion 36 via the second upper side straight portion 32 at a high speed are not directly collided with the curved recess 37 of the connection portion 36 but collide with a plurality of flow fields such as a vortex flow field formed at the curved recess 37 of the connection portion 36 in a low flow speed and high pressure.

At this time, the fluids which are forwarded at the first upper side straight portion 32 at a high speed collide with a plurality of flow fields formed at the curved recess 37 of the connection portion 36, so that the collision energy is significantly decreased during the collision at the flow fields. Even when the fluids pass through the flow field and reach at the inner wall of the curved recess 37 based on the remaining collision energy, since the collision energy is nearly used up during the process that the fluids pass through the flow fields, the curved recess 37 of the connection portion 36 is not worn.

In addition, since the lower side flow direction changing portion 35 is expanded to the outside of the standard flow range R, a plurality of flow fields such as a vortex flow field are formed in a high flow speed and low. pressure state.

Even when the fluids which flow from the first upper side straight portion 31 to the lower side straight portion 33 are forwarded to the lower side flow direction changing portion 35 between the second upper side straight portion 32 and the lower side straight portion 33, the fluids do not directly collide with the inner wall of the lower side flow direction changing portion 35 but collide with a plurality of flow fields, so that a collision energy is decreased. Even when the fluids pass through the flow fields and reach at the inner wall of the lower side flow direction changing portion 35 based on the remaining collision energy, since the collision energy is nearly used during the process that the fluids pass through the flow fields, the inner wall of the lower side flow direction changing portion 35 is not worn.

Figure 4:
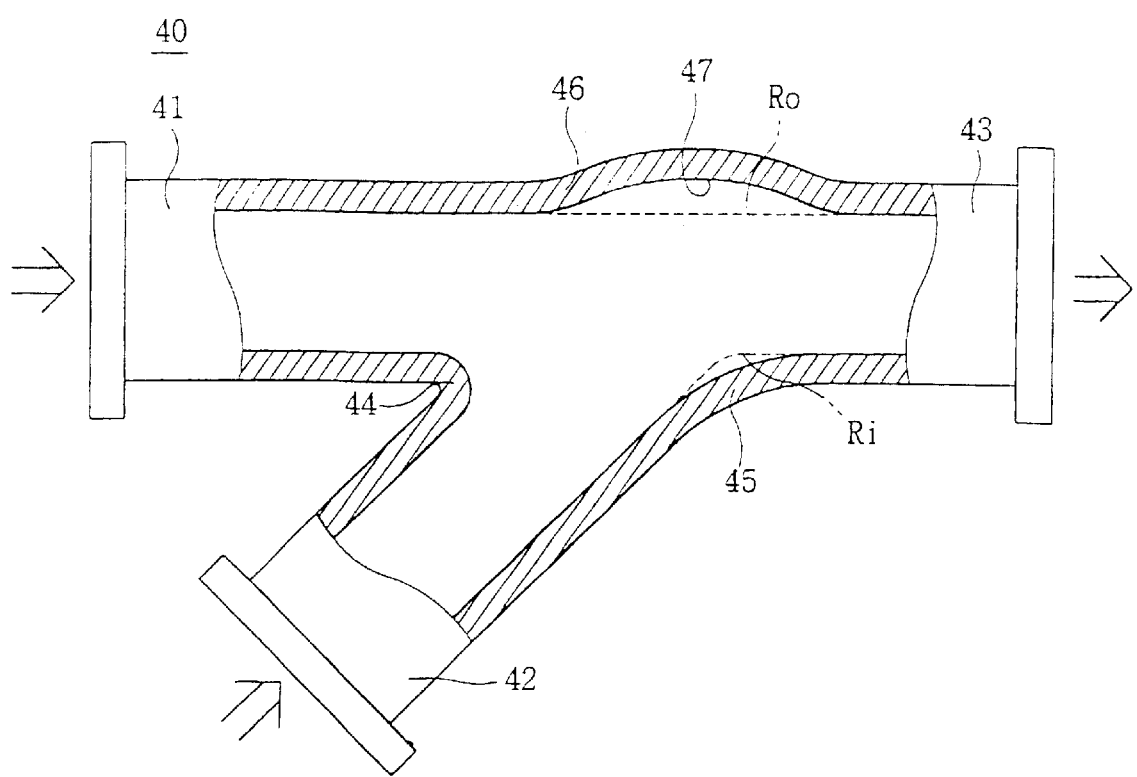
FIG. 4 is a cross-sectional view illustrating a Y-shaped coupling pipe according to a fourth embodiment of the present invention.

FIG. 4 illustrates a fourth embodiment of the present invention adapted to the Y-shaped coupling pipe 40 which includes a first upper side straight portion 41, a lower side straight portion 43 extended on the same axis as the first upper side straight portion 41, and a second upper side straight portion 42 connecting the first upper side straight portion 41 and the lower side straight portion 43 at an angle of 45.

An upper side flow direction changing portion 40 is formed between the first upper side straight portion 41 and the second upper side straight portion 42, and a lower side flow direction changing portion 45 is formed between the second upper side straight portion 42 and the lower side straight portion 43, and a connection portion 46 is formed between the first upper side straight portion 41 and the lower side straight portion 43.

The upper side flow direction changing portion 44 is formed based on the standard flow range Ri, and the lower side flow direction changing portion 45 is expanded to the outside of the standard flow range Ri.

A curved recess 47 which is expanded to the outside of the standard flow range Ro is formed at a portion encountered with an extended line of the second upper side straight portion 42, so that the diameter of the pipe is increased.

In the Y-shaped coupling pipe 40 according to the present invention, the different structure with T-shaped coupling pipe 300 is that the connection angle of the second upper side straight portion 42 with respect to the first upper side straight portion 41 and the lower side straight portion 43 is 45. In this embodiment of the present invention, the abrasion at the connection portion 36 and the lower side flow direction changing portion 45 is significantly decreased based on an operation at the T-shaped coupling pipe 30. The detailed operation will be omitted.

Figure 5B:
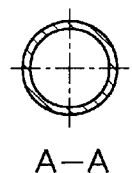
FIGS. 5B, 5C, 5D, 5E and 5F are respectively cross-sectional views of the coupling pipe shown in FIG. 5A taken along lines A—A, B—B, C—C, D—D, E—E and F—F in FIG. 5A.
Figure 5C:
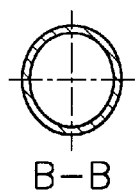
Figure 5D:
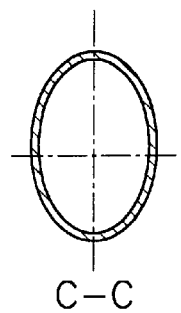
Figure 5E:
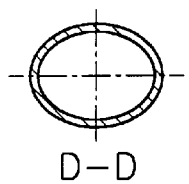
Figure 5F:
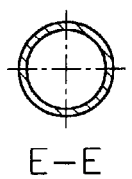

FIG. 5A illustrates a fifth embodiment of the present invention adapted to the 90° elbow shaped coupling pipe, and FIGS. 5B, 5C, 5D, 5E and 5F are cross-sectional views of the coupling pipe shown in FIG. 5A taken along lines A—A, B—B, C—C, D—D, E—E and F—F in FIG. 5A respectively. In the fifth embodiment of the present invention, upper side curved portions 13au and 13bu and lower side curved portions 13ad and 13bd are formed between the upper side straight portion 11 and the flow direction changing portion 13. Since the remaining structures are the same as the first embodiment of the present invention, the same elements are given the same reference numerals, and the detailed description thereof will be omitted.

Figure 6:
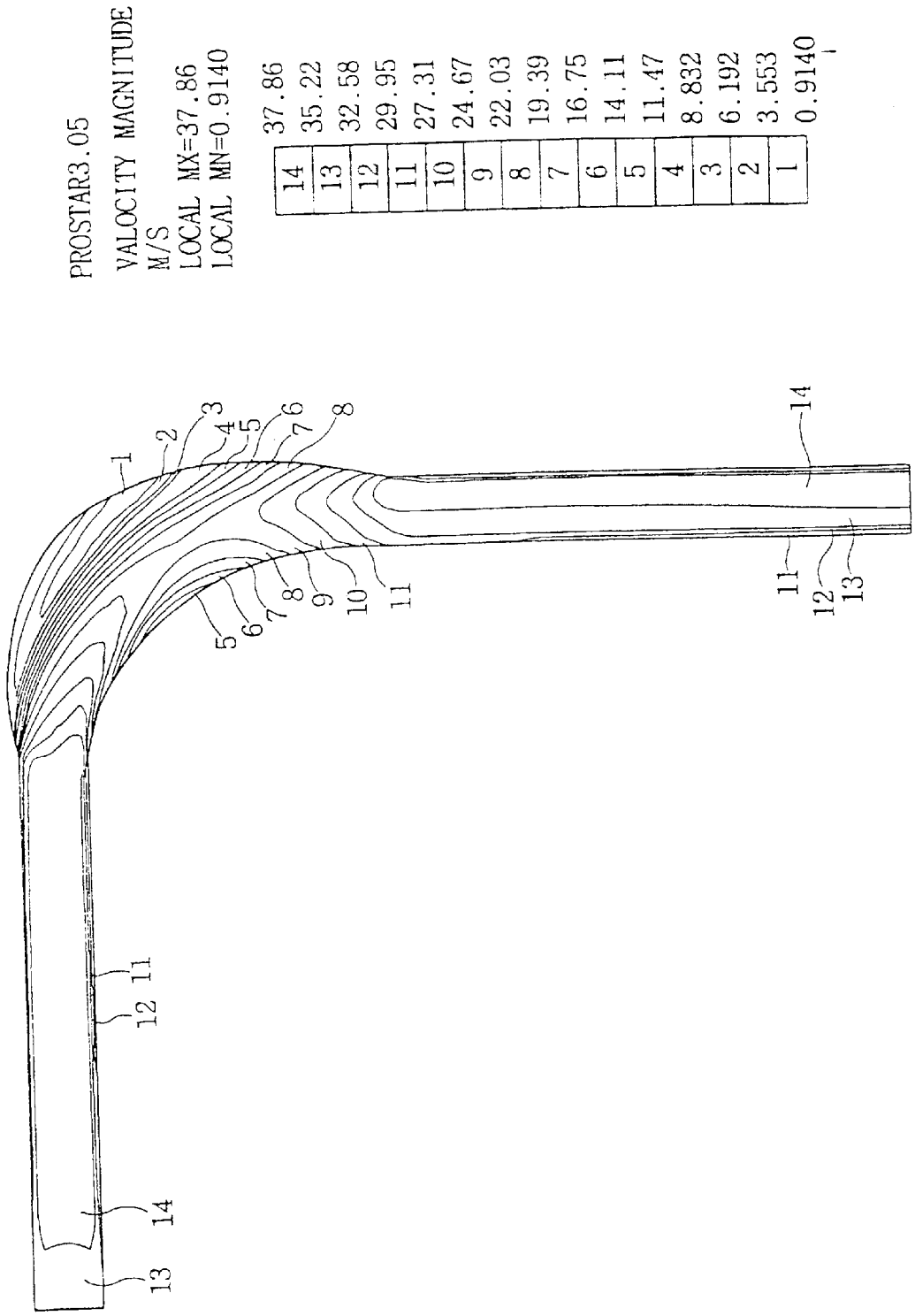
FIG. 6 is a view illustrating a fluid flowing speed distribution according to a fifth embodiment of the present invention.

FIG. 6 illustrates a fluid flow speed distribution of a 90 elbow shaped coupling pipe according to the present invention, and FIG. 7 illustrates a pressure distribution. As shown therein, the flow speed is low at the outer side curved portion 13a and the inner side curved portion 13b of the flow direction changing portion 13, and the pressure is high a the outer side curved portion 13a.

Figure 8B:
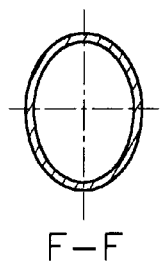
FIGS. 8B, 8C, 8D and 8E are respectively cross-sectional views of the coupling pipe shown in FIG. 8A taken along lines F—F, G—G, H—H and I—I in FIG. 8A.
Figure 8C:
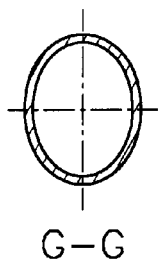
Figure 8D:
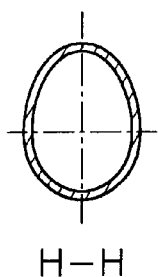
Figure 8E:
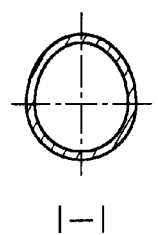

FIG. 8A illustrates a sixth embodiment of the present invention adapting a 45° elbow shaped coupling pipe, and FIGS. 8B, 8C, 8D and 8E are respectively cross-sectional views of the coupling pipe shown in FIG. 8A taken along lines F—F, G—G, H—H and I—I in FIG. 8A. In this embodiment of the present invention, upper side curved portions 23au and 23bu and lower side curved portions 23ad and 23bd are formed between the upper side straight portion 21 and the flow direction changing portion 23. The remaining constructions are the same as in the second embodiment of the present invention except for the above-described construction. Therefore, the description thereof will be omitted.

Figure 9:
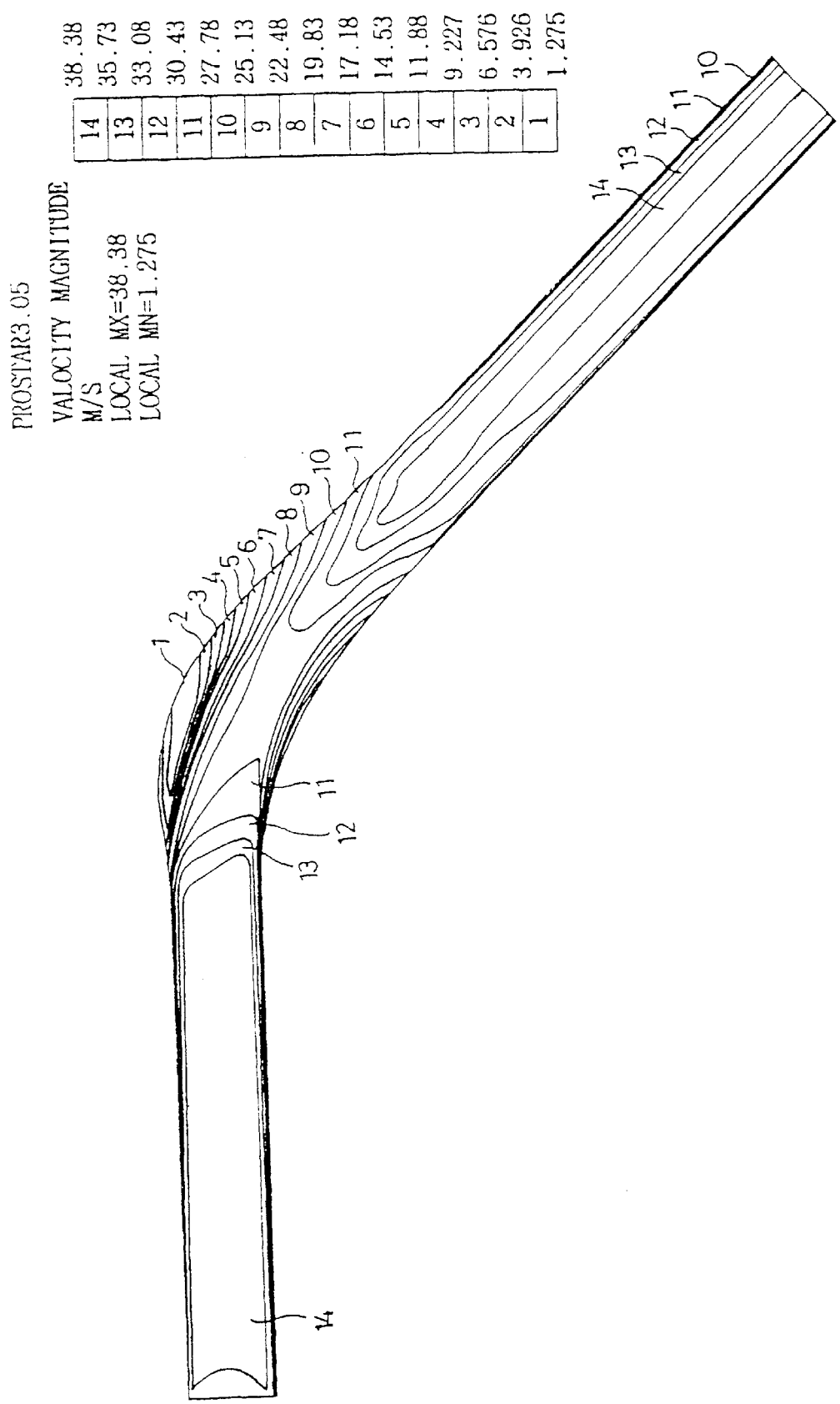
FIG. 9 is a view illustrating a fluid flowing speed distribution according to a sixth embodiment of the present invention.
Figure 10:
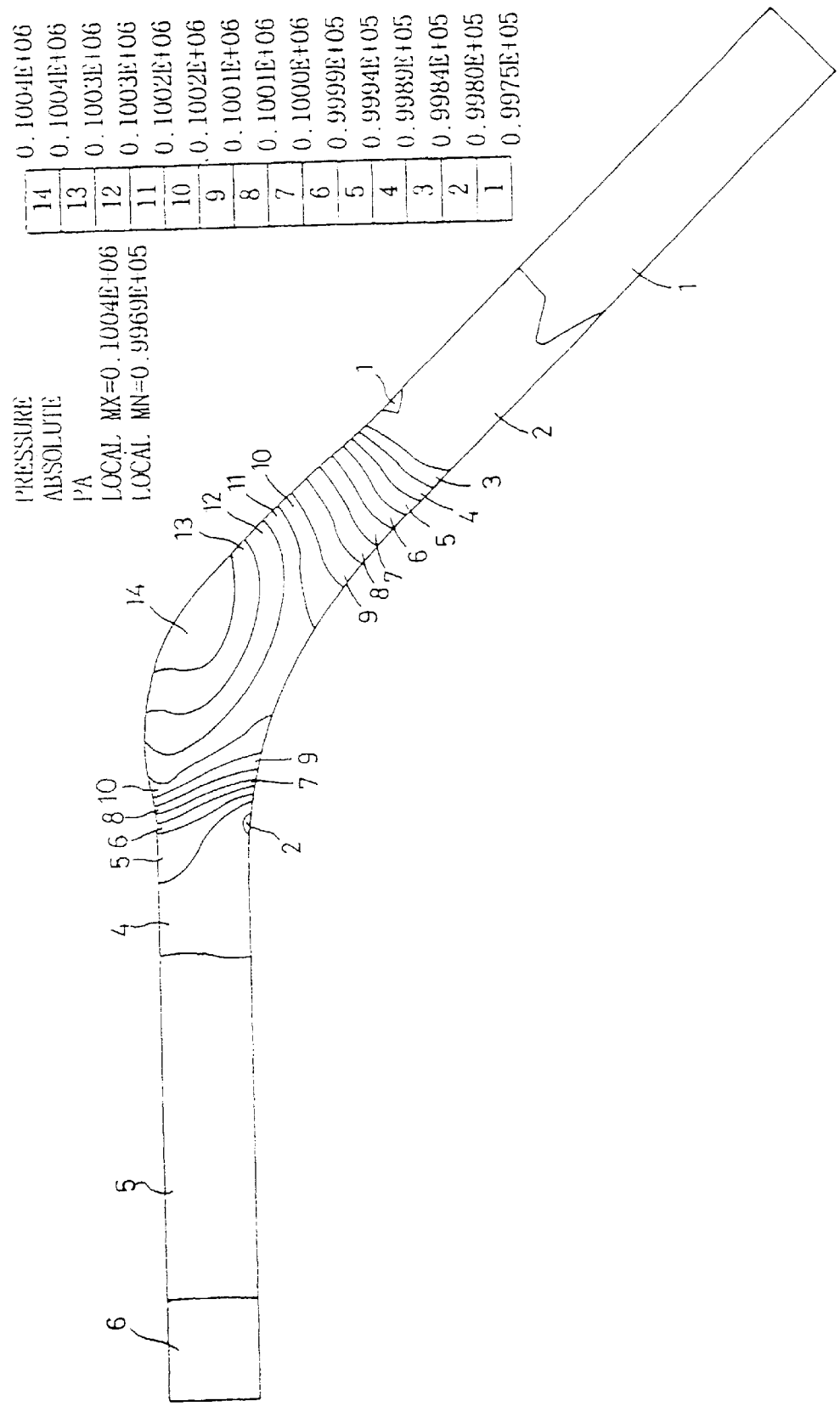
FIG. 10 is a view illustrating a pressure distribution according to a sixth embodiment of the present invention.

FIG. 9 illustrates a flow speed distribution of the 45 elbow shaped coupling pipe according to the present invention, and FIG. 10 illustrates a pressure distribution. As shown therein, the flow speed is low at the outer side curved portion 23a and the inner side curved portion 23b, and the pressure is high at the outer side curved portion 23a.

Figure 11A:
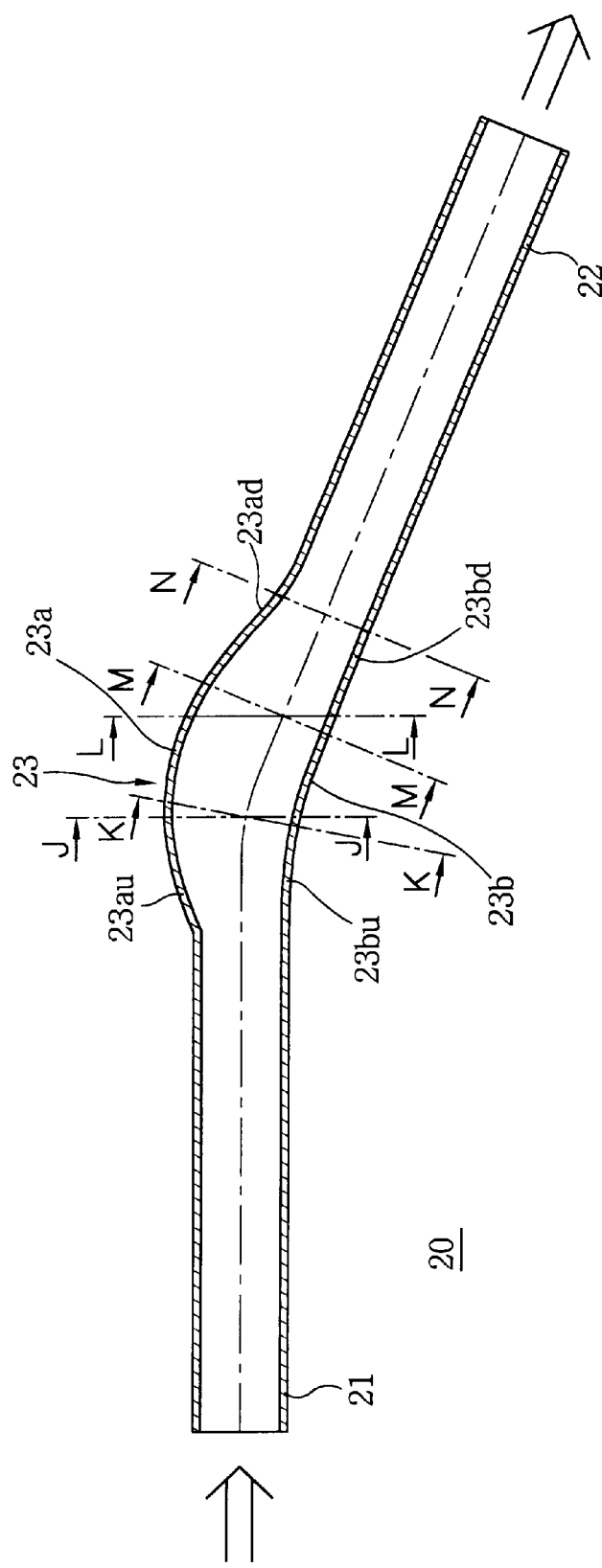
FIG. 11A is a cross-sectional view illustrating a 22.5° elbow shaped coupling pipe according to a seventh embodiment of the present invention.
Figure 11B:
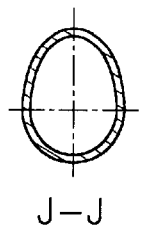
FIGS. 11B, 11C, 11D, 11E and 11F are respectively cross-sectional views of the coupling pipe shown in FIG. 11A taken along lines J—J, K—K, L—L, M—M, and N—N in FIG. 11A.
Figure 11C:
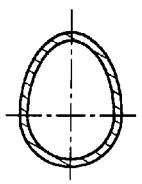
Figure 11D:
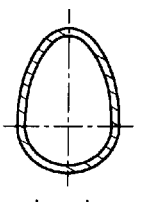
Figure 11E:
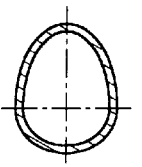
Figure 11F:
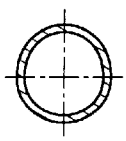
Figure 14A:
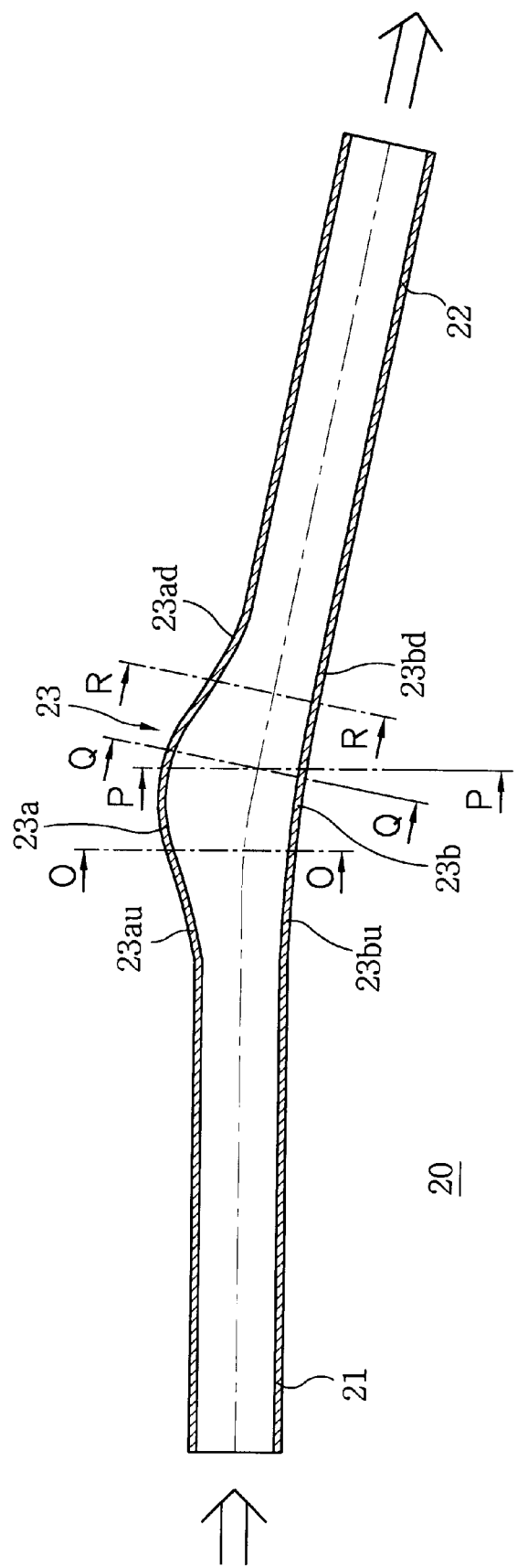
FIG. 14A is a cross-sectional view illustrating a 11.25° elbow shaped coupling pipe according to an eighth embodiment of the present invention.
Figure 14B:
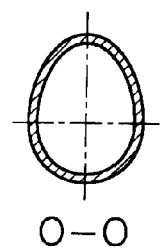
FIGS. 14B, 14C, 14D and 14E are respectively cross-sectional views of the coupling pipe shown in FIG. 14A taken along lines O—O, P—P, Q—Q and R—R in FIG. 14A.
Figure 14C:
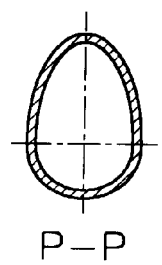
Figure 14D:
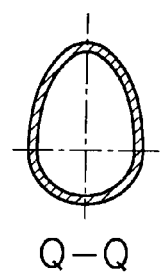
Figure 14E:
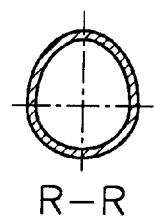
Figure 15:
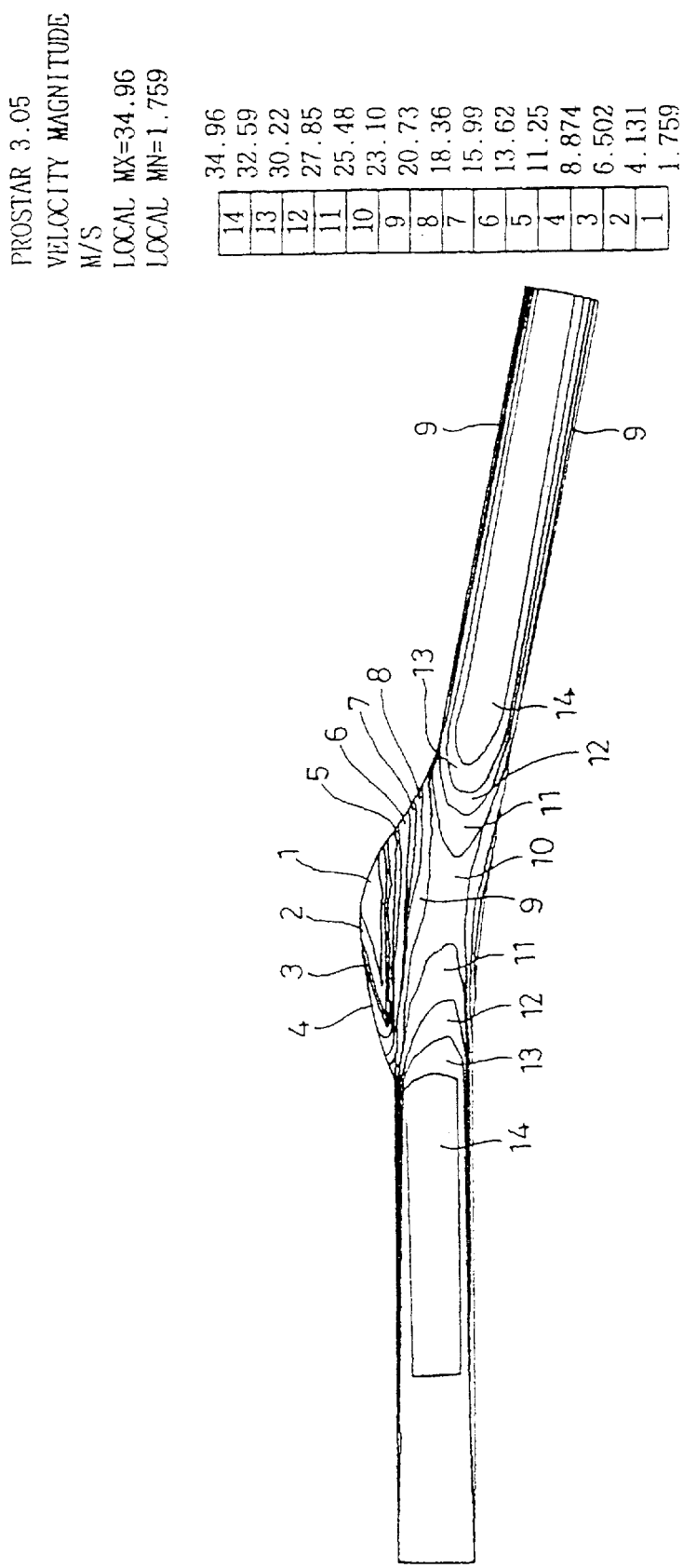
FIG. 15 is a view illustrating a fluid flowing speed distribution according to an eighth embodiment of the present invention.

FIG. 11A illustrates a seventh embodiment of the present invention adapting a 22.5° elbow shaped coupling pipe, and FIGS. 11B, 11C, 11D, 11E and 11F are respectively cross-sectional views of the coupling pipe shown in FIG. 11A taken along lines J—J, K—K, L—L, M—M, and N—N in FIG. 11A. FIG. 14A illustrates an eighth embodiment of the present invention adapted to the 11.25° elbow shaped coupling pipe, and FIGS. 14B, 14C, 14D and 14E are respectively cross-sectional views of the coupling pipe shown in FIG. 14A taken along lines O—O, P—P, Q—Q and R—R in FIG. 14A. As shown therein, the angle between the upper side straight portion 21 and the lower side straight portion 22 is different. The remaining constructions are the same as the sixth embodiment of the present invention. Therefore, the description thereof will be omitted.

Figure 12:
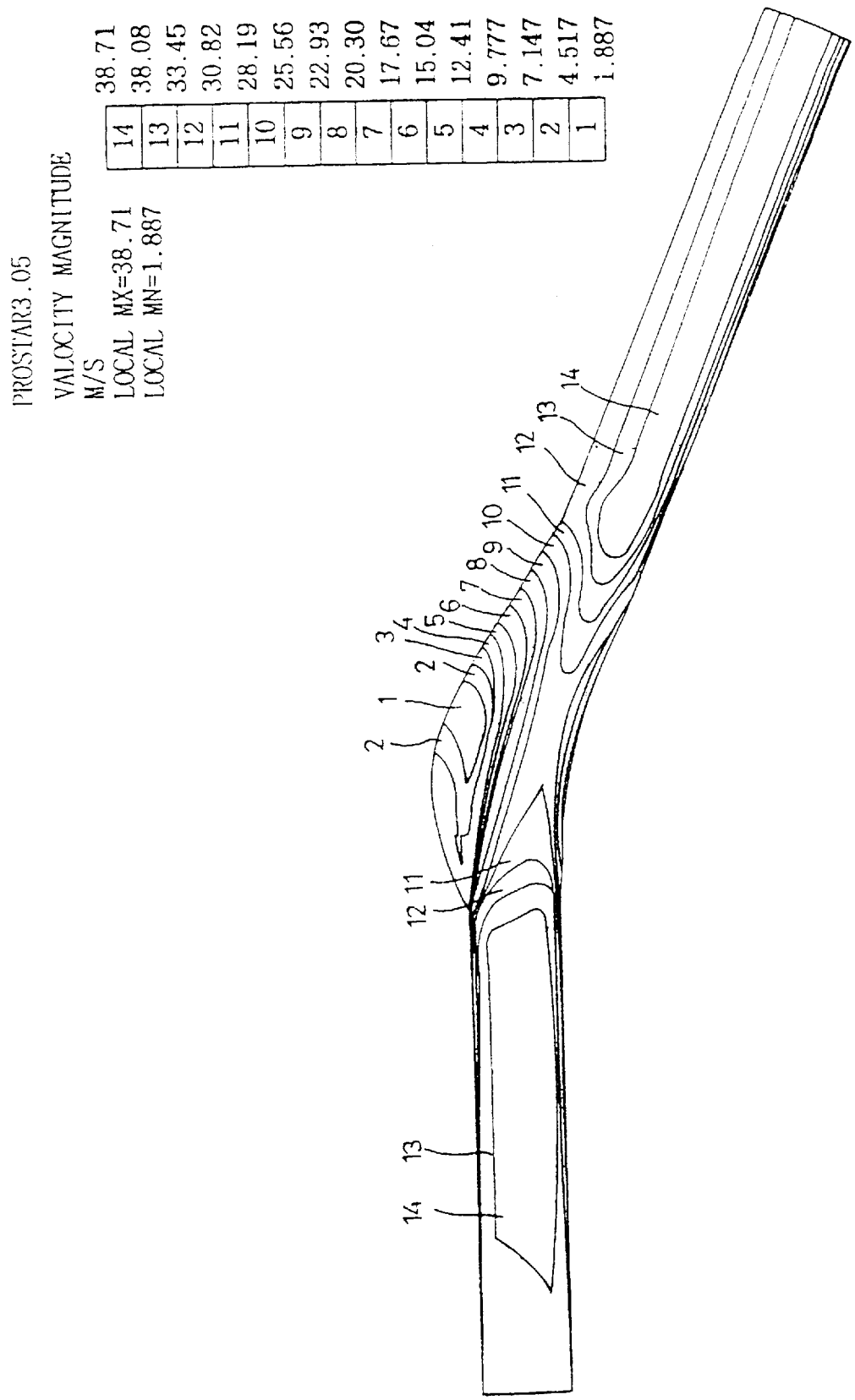
FIG. 12 is a view illustrating a fluid flowing speed distribution according to a seventh embodiment of the present invention.
Figure 13:
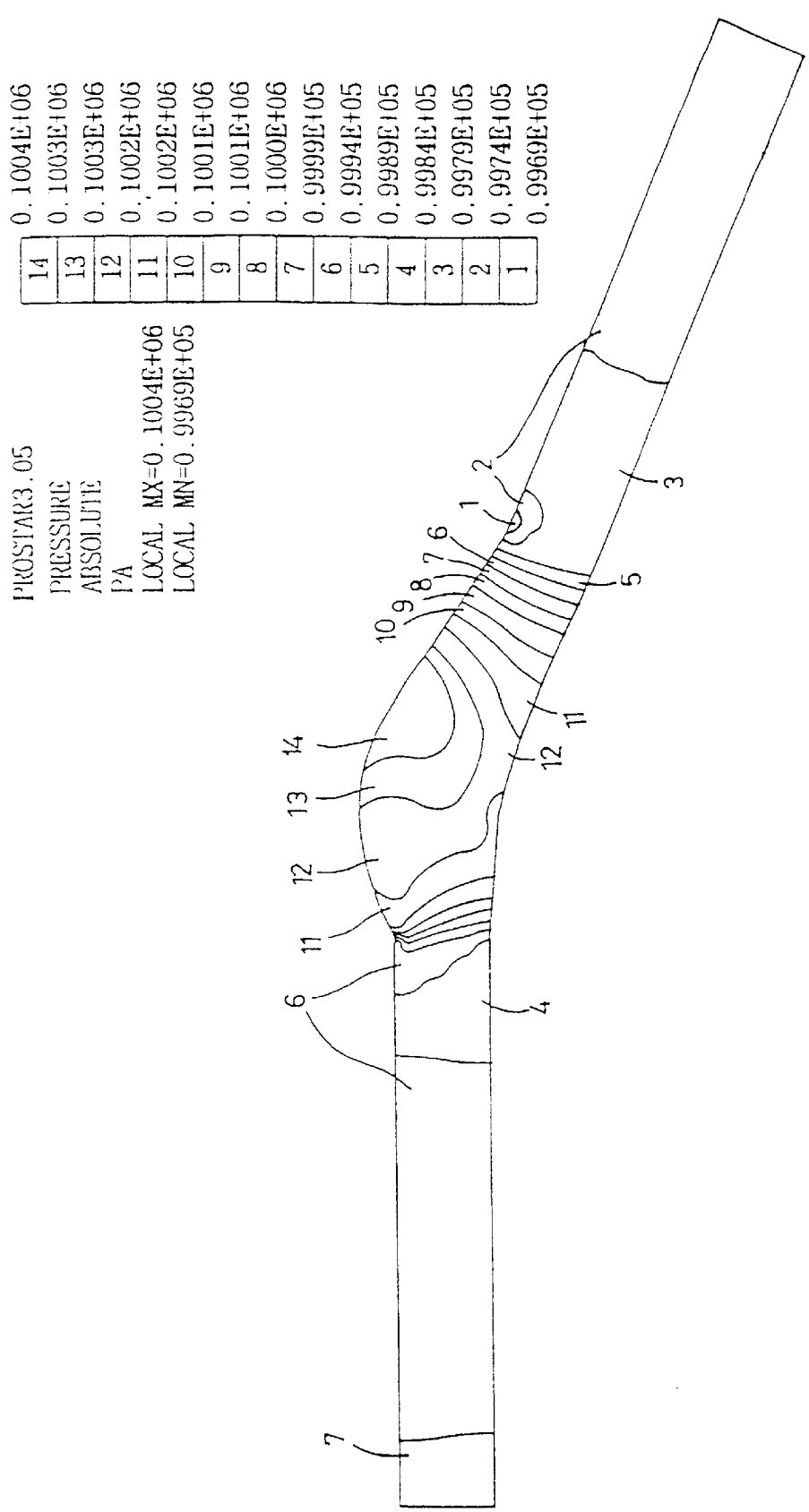
FIG. 13 is a view illustrating a pressure distribution according to a seventh embodiment of the present invention.
Figure 16:
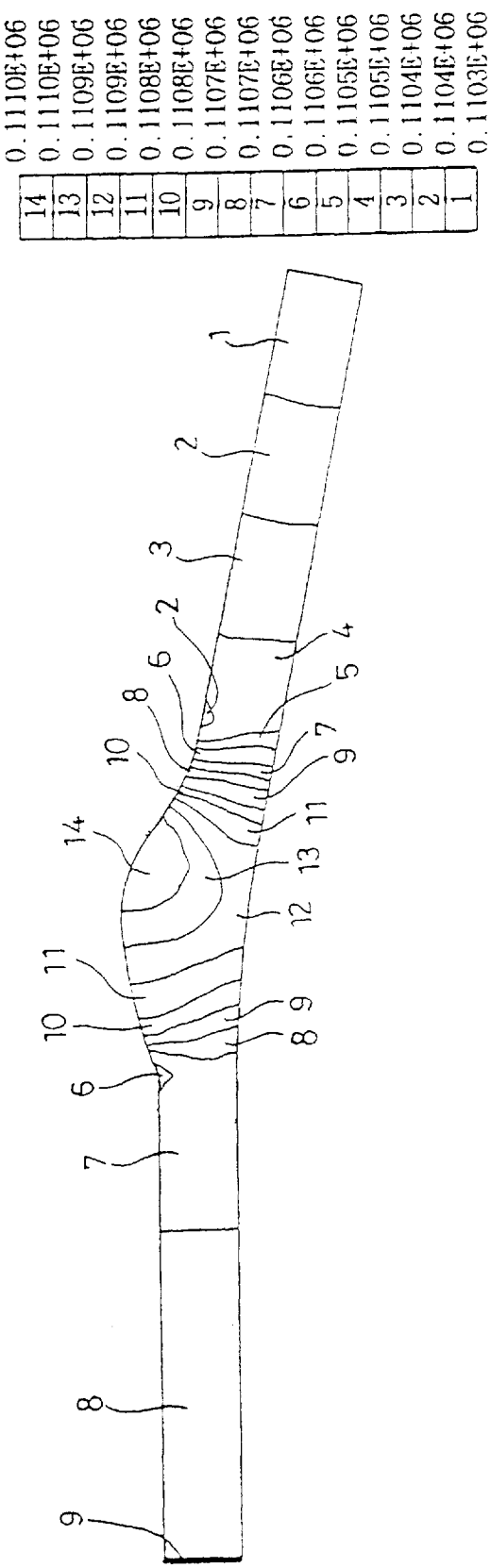
FIG. 16 is a view illustrating a pressure distribution according to an eighth embodiment of the present invention.

The flow speed distribution of the seventh embodiment of the present invention is shown in FIG. 12, and the pressure distribution is shown in FIG. 13. The flow speed distribution of the eighth embodiment of the present invention is shown in FIG. 14, and the pressure distribution of the eighth embodiment is shown in FIG. 16.

Figure 17A:
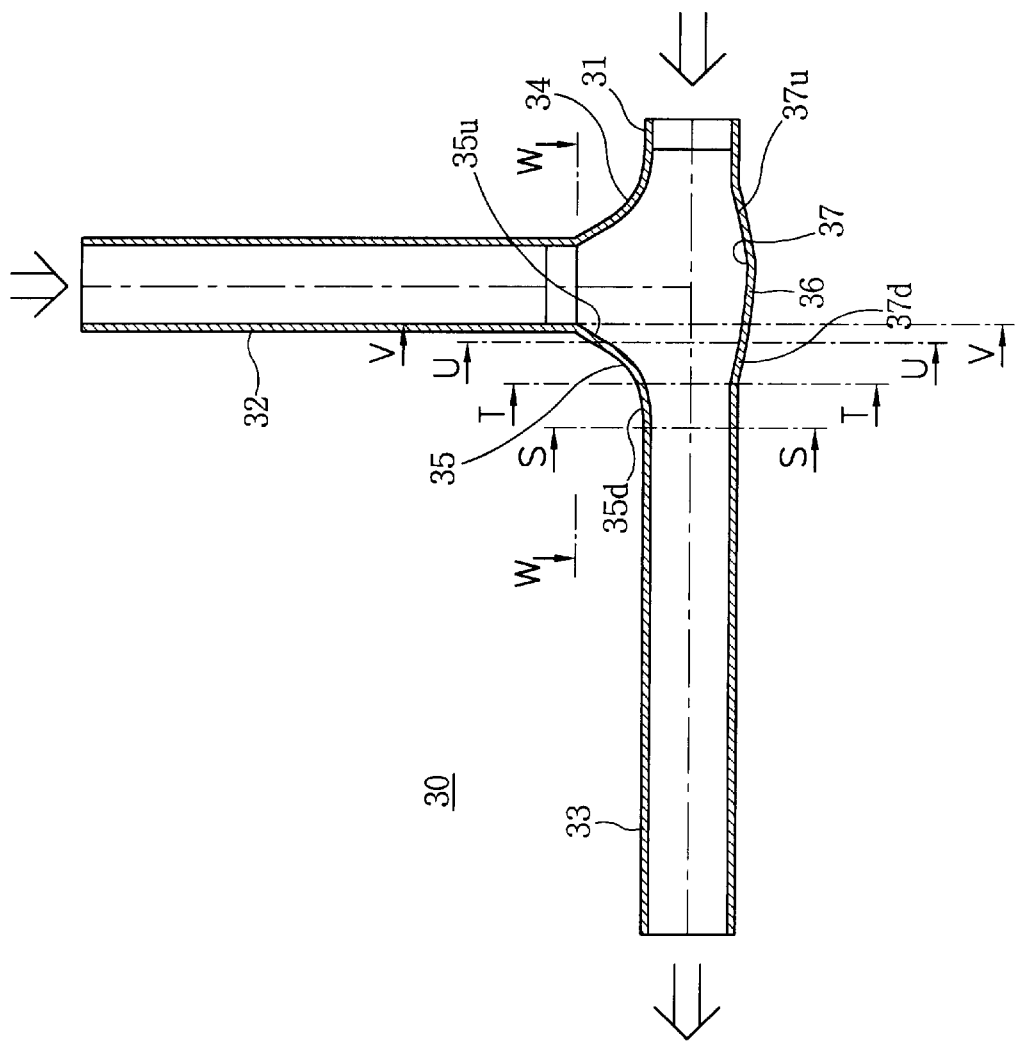
FIG. 17A is a cross-sectional view illustrating a 90° T-shaped coupling pipe according to a ninth embodiment of the present invention.
Figure 17B:
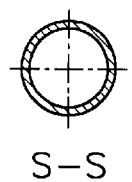
FIGS. 17B, 17C, 17D, 17E and 17F are respectively cross-sectional views of the coupling pipe shown in FIG. 17A taken along lines S—S, T—T, U—U, V—V and W—W in FIG. 17A.
Figure 17C:
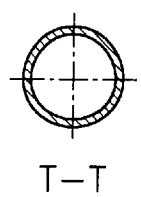
Figure 17D:
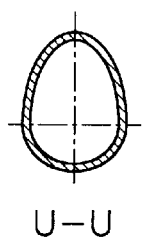
Figure 17E:
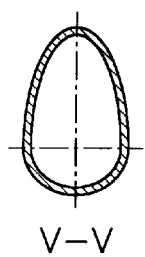
Figure 17F:
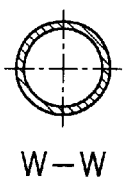

FIG. 17A illustrates a ninth embodiment of the present invention adapting a 90° T-shaped coupling pipe, and FIGS. 17B, 17C, 17D, 17E and 17F are respectively cross-sectional views of the coupling pipe shown in FIG. 17A taken along lines S—S, T—T, U—U, V—V and W—W in FIG. 17A. As shown therein, curved portions 35u and 35d are formed between both ends of the lower side flow changing portion 35 and the second upper side straight portion 32 and the lower side straight portion 33. Curved portions 37u and 37d are formed between the curved recess 37 and the first upper side straight portion 31 and the lower side straight portion 33. The remaining constructions are the same as the third embodiment of the present invention. Therefore, the same elements as the third embodiment of the present invention are given the same reference numerals. In addition, description thereof will be omitted.

Figure 18:
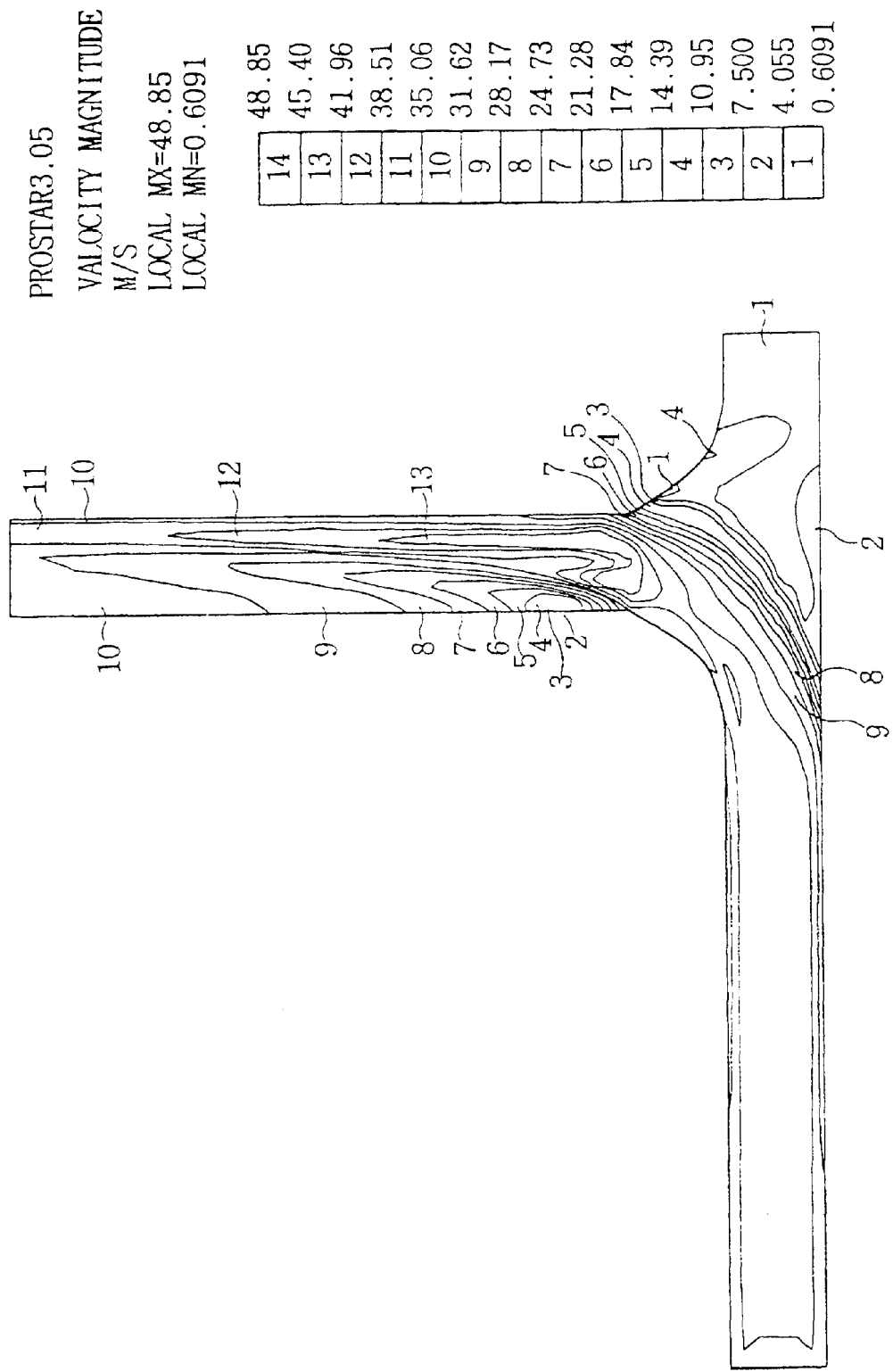
FIG. 18 is a view illustrating a fluid flowing speed distribution according to a ninth embodiment of the present invention.

FIG. 18 illustrates a flow speed distribution according to the present invention, and FIG. 19 illustrates a pressure distribution.

Figure 20B:
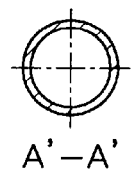
FIGS. 20B, 20C, 20D, 20E, 20F, 20G and 20H are respectively cross-sectional views of the coupling pipe shown in FIG. 20A taken along lines A'—A', B'—B', C'—C', D'—D', E'—E', F'—F' and G'—G' in FIG. 20A.
Figure 20C:
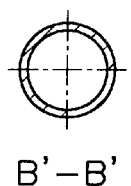
Figure 20D:
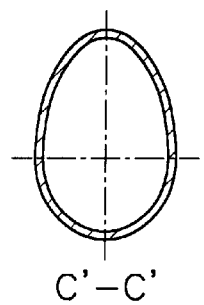
Figure 20E:
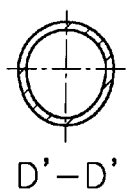
Figure 20F:
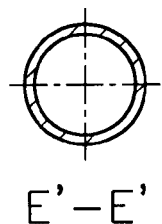
Figure 20G:
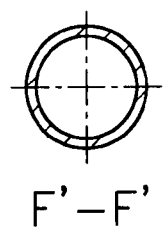
Figure 20H:
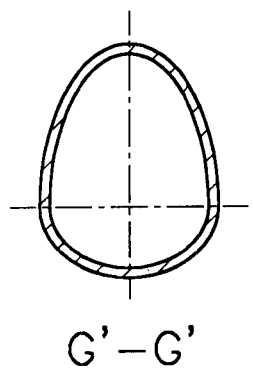

FIG. 20A illustrates a tenth embodiment of the present invention adapted to the Y-shaped coupling pipe, and FIGS. 20B, 20C, 20D, 20E, 20F, 20G and 20H are respectively cross-sectional views of the coupling pipe shown in FIG. 20A taken along lines A'—A', B'—B', C'—C', D'—D', E'—E', F'—F' and G'—G' in FIG. 20A. In this embodiment, the connection angle of the second upper side straight portion 32 with respect to the first upper side straight portion 31 and the lower side straight portion 33 is 45 degrees. The remaining constructions are the same as in the ninth embodiment of the present invention. Therefore, the same elements as the ninth embodiment of the present invention will be given the same reference numerals. The description thereof will be omitted.

Figure 21:
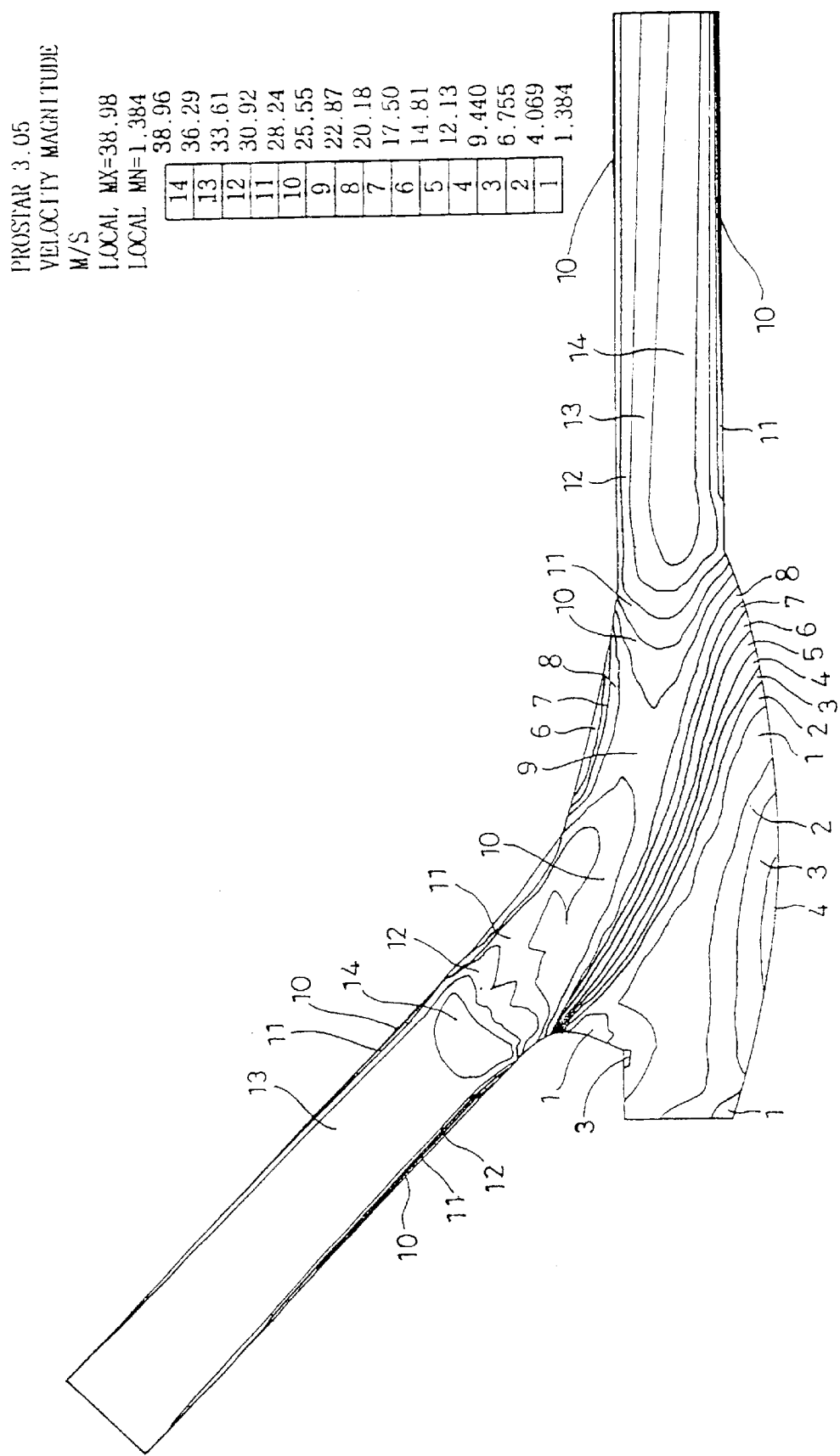
FIG. 21 is a view illustrating a fluid flowing speed distribution according to a tenth embodiment of the present invention.
Figure 22:
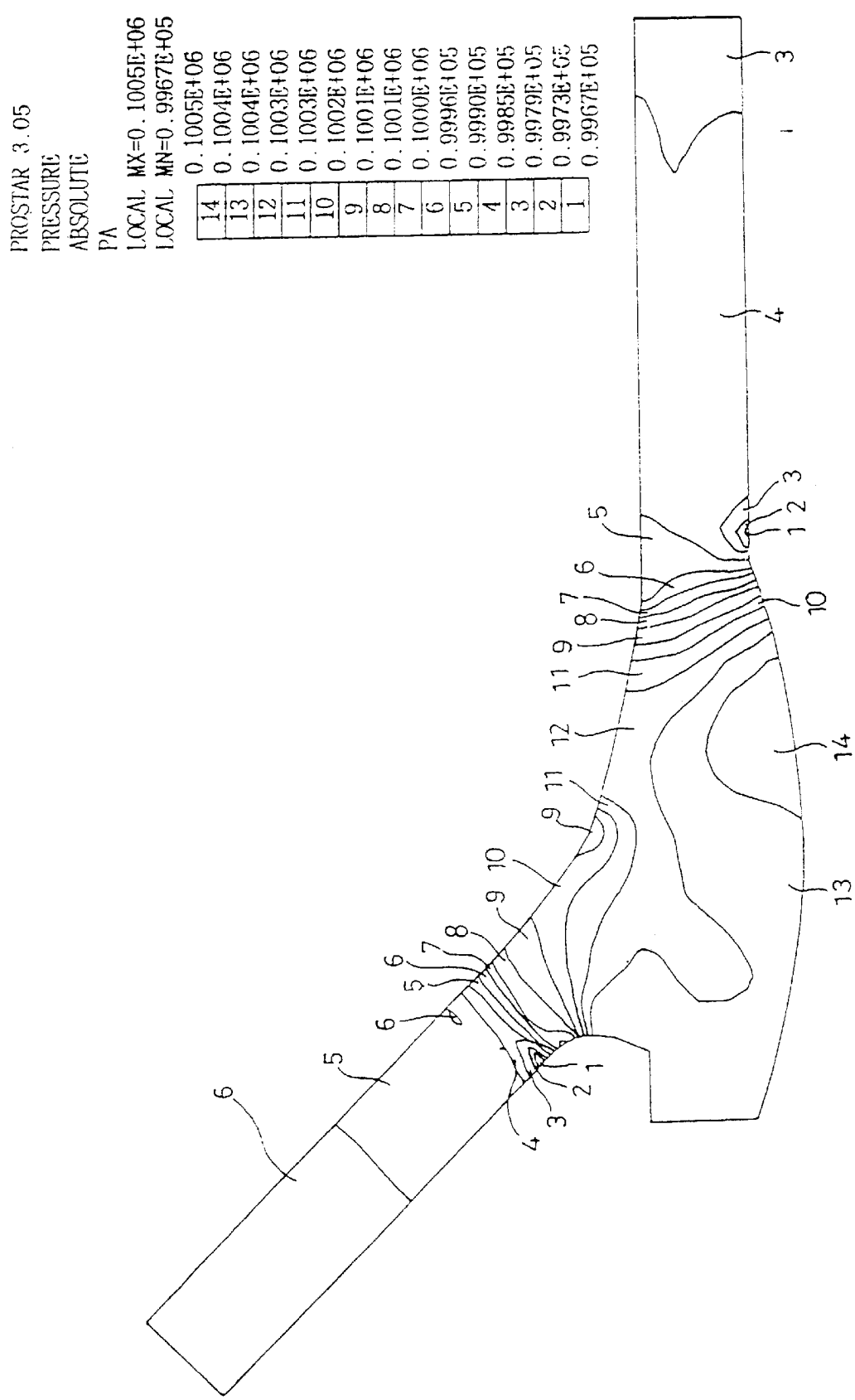
FIG. 22 is a view illustrating a pressure distribution according to a tenth embodiment of the present invention.
Figure 23:
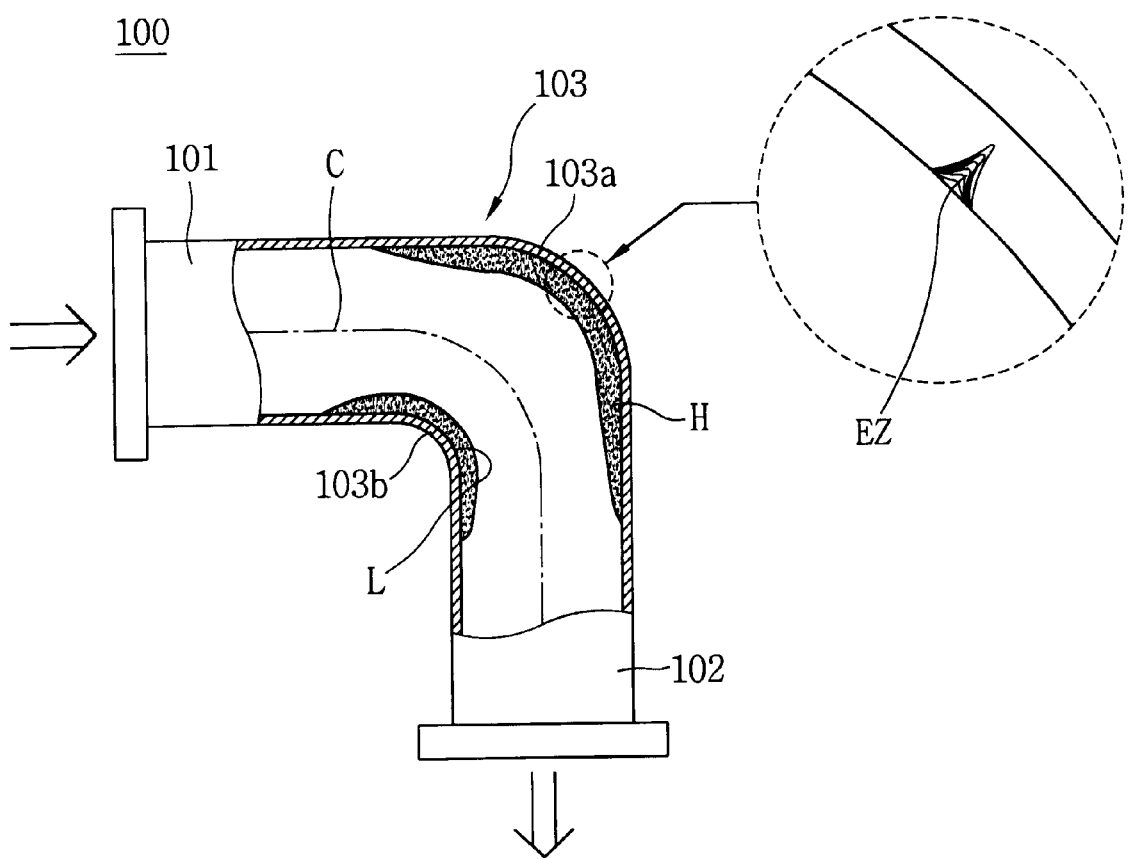
FIG. 23 is a cross-sectional view illustrating a conventional 90 elbow shaped coupling pipe.
Figure 24:
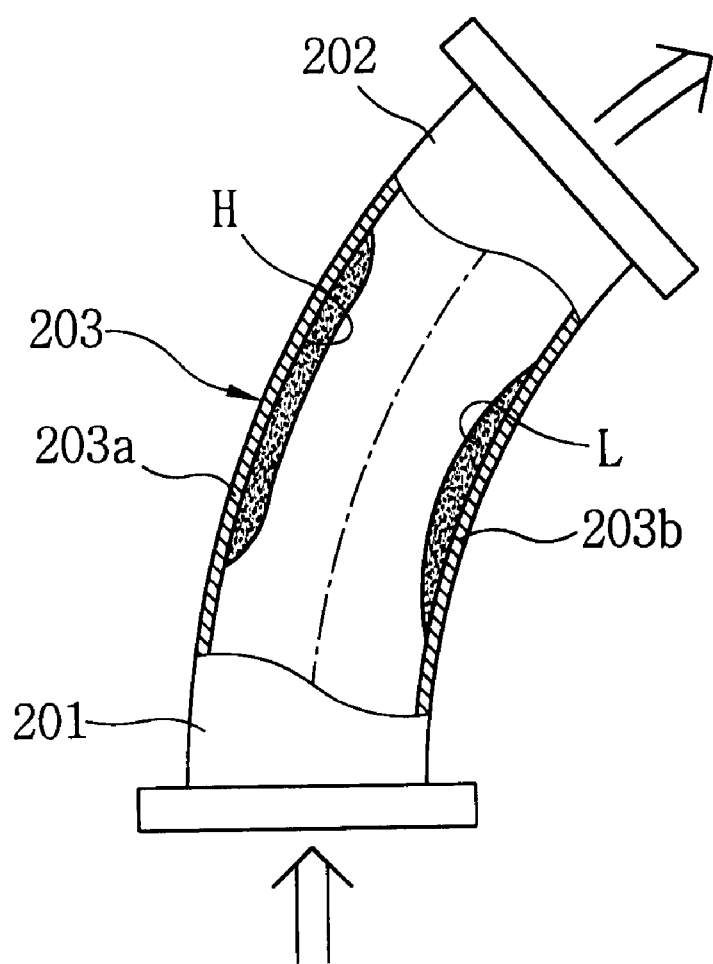
FIG. 24 is a cross-sectional view illustrating a conventional 45 elbow shaped coupling pipe.
Figure 25:
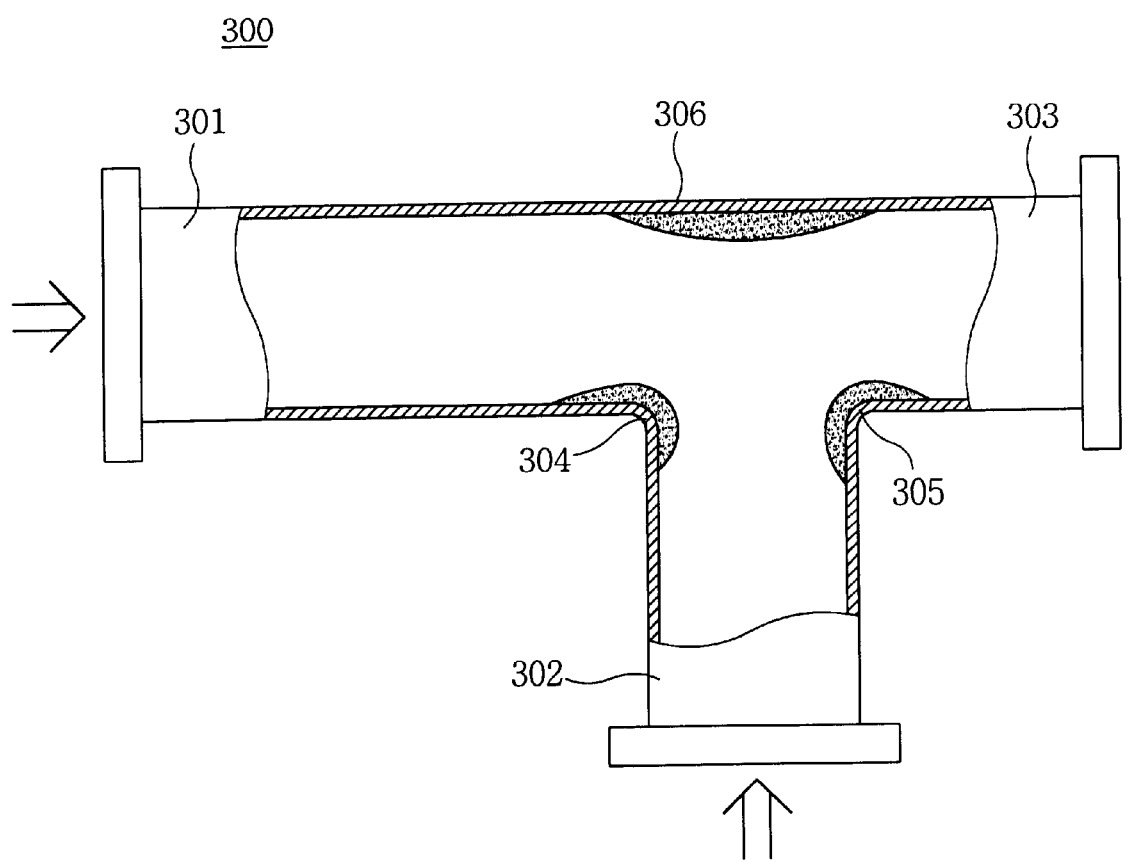
FIG. 25 is a cross-sectional view illustrating a conventional T-shaped coupling pipe.
Figure 26:
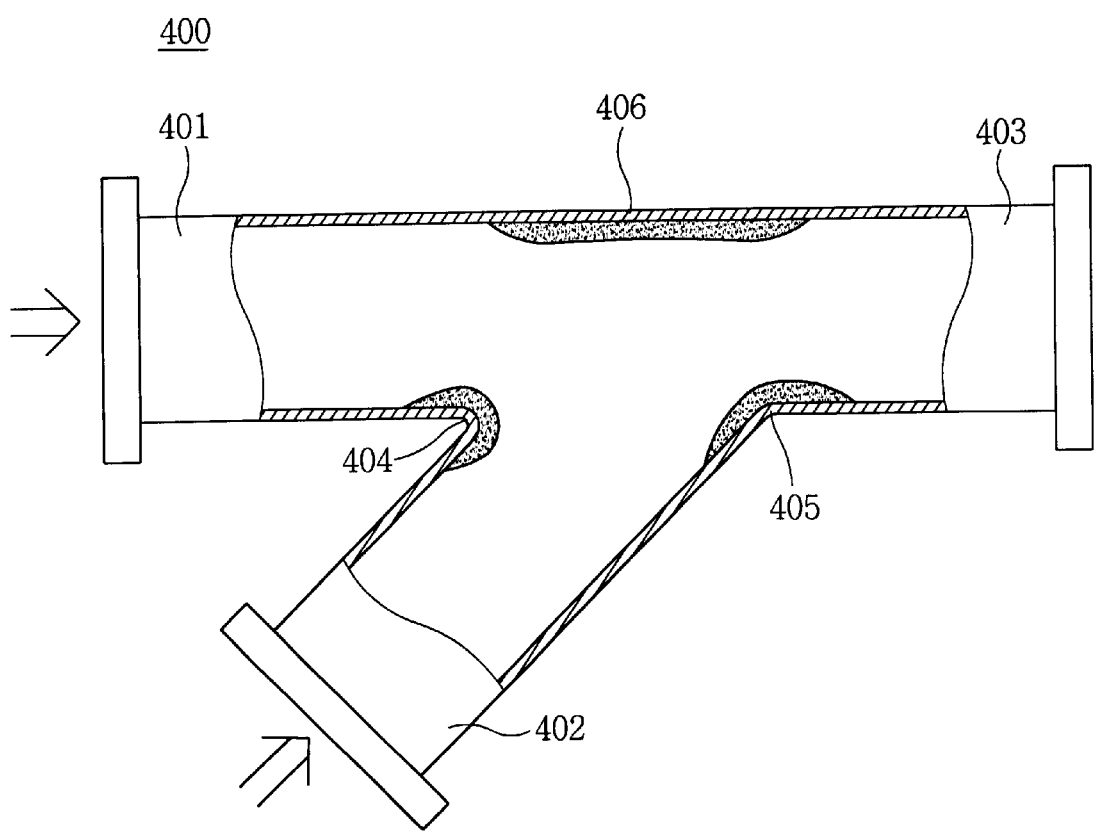
FIG. 26 is a cross-sectional view illustrating a conventional Y-shaped coupling.
Figure 27:
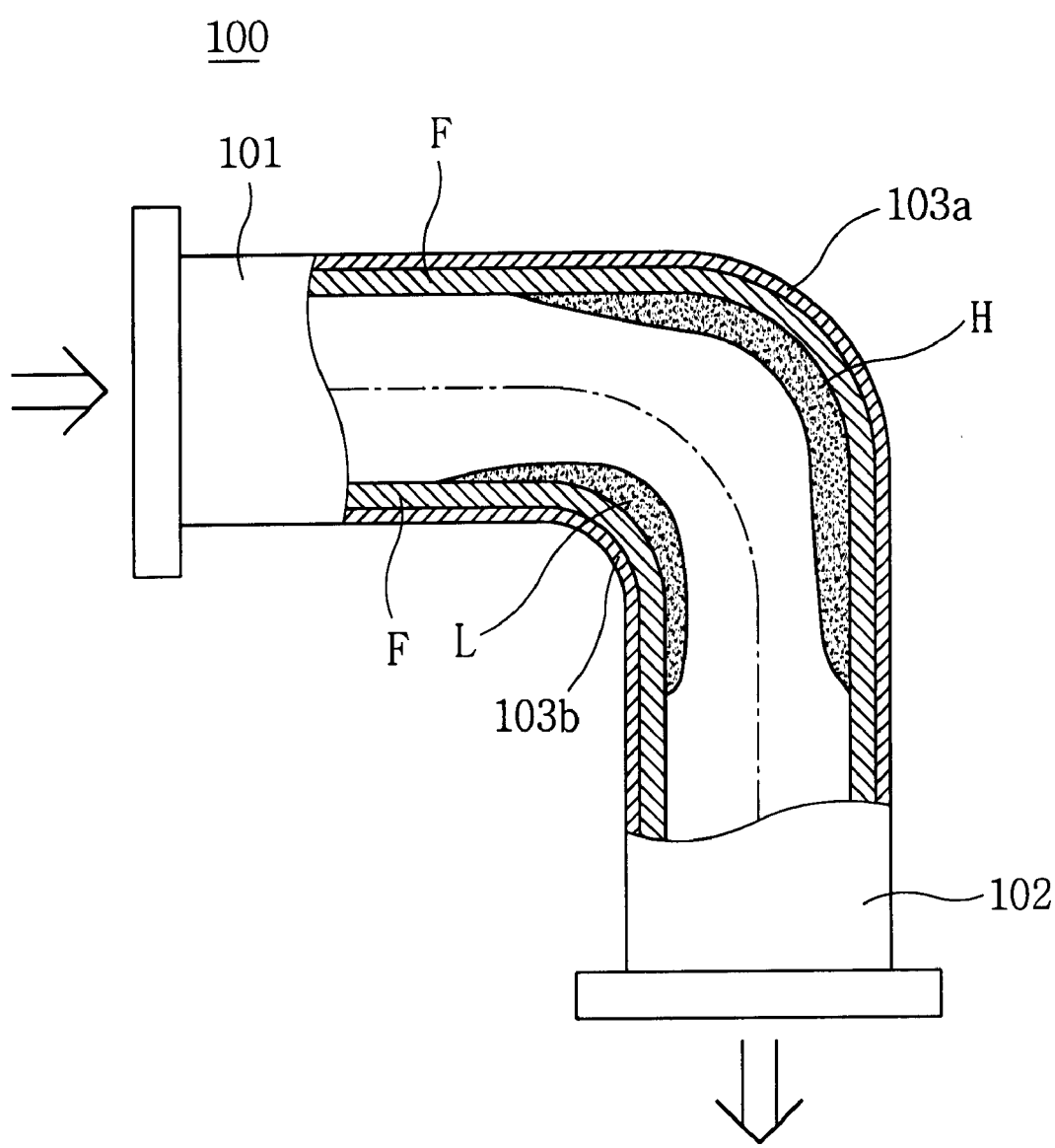
FIGS. 27 through 30 are cross-sectional views illustrating a state that a pipe inner wall of a conventional curved coupling pipe of FIGS. 23 through 26 is lined.
Figure 28:
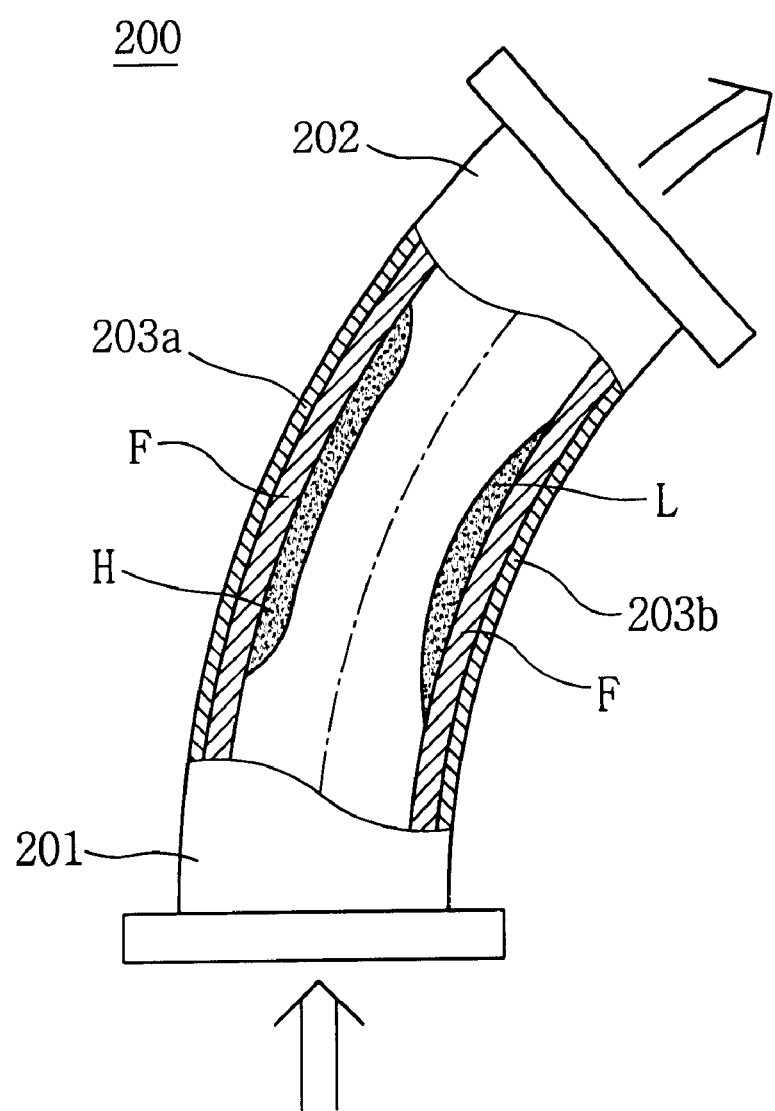
Figure 29:
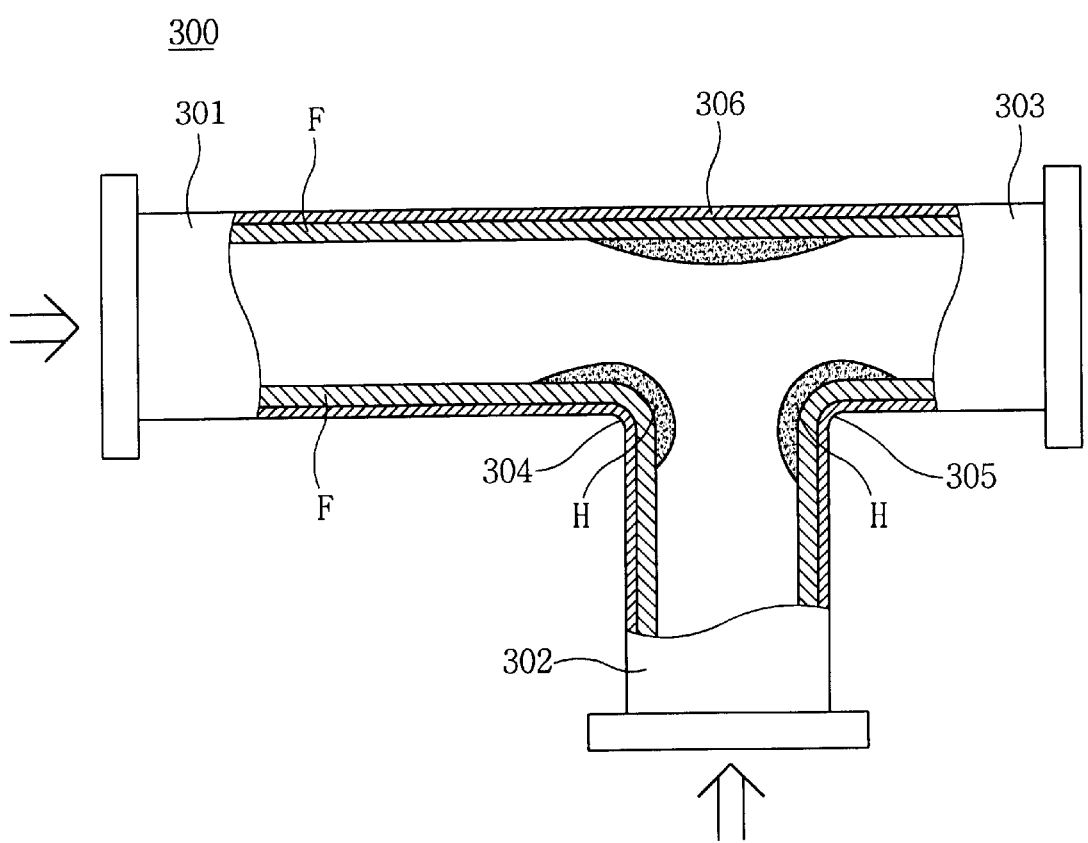
Figure 30:
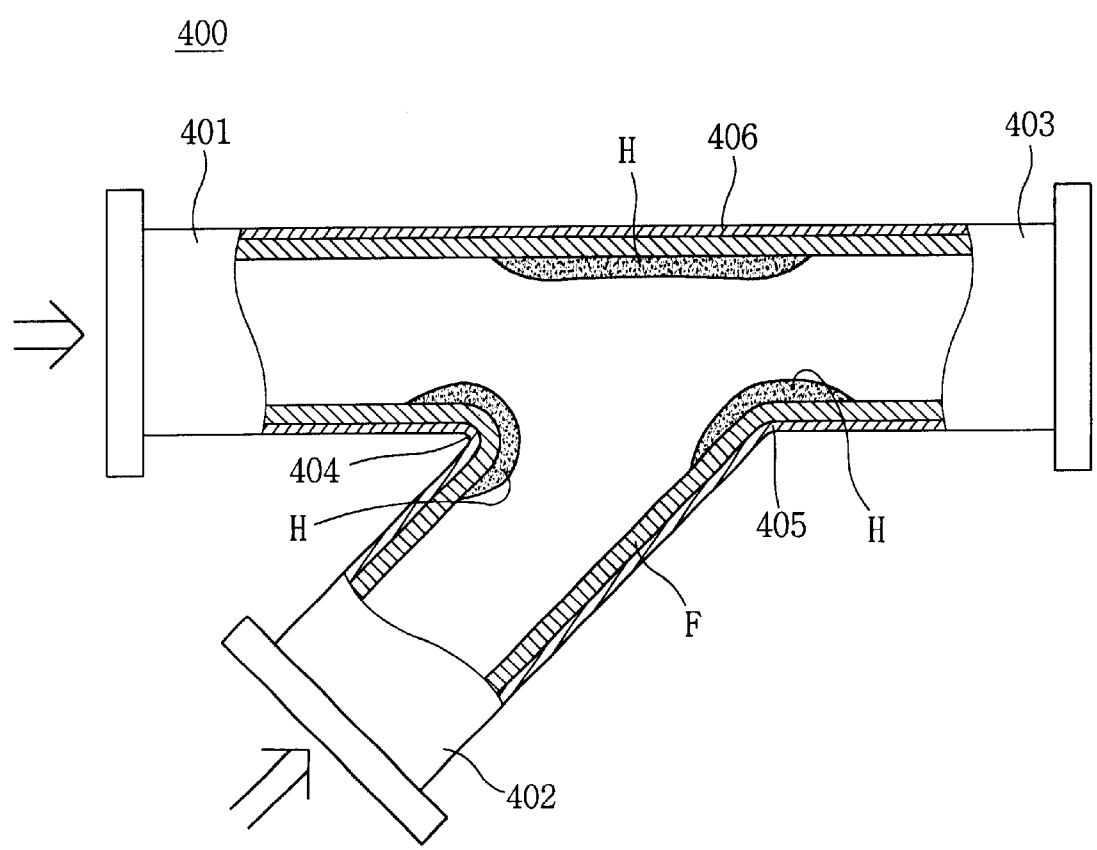

FIG. 21 illustrates a flow speed distribution according to the present invention, and FIG. 22 illustrates a pressure distribution according to the present invention.

The present invention may be adapted to a pipe capable of feeding powder materials at a high speed based on a pneumatic pressure, a pipe capable of feeding powder materials at a high speed by a pressurized liquid or a pressurized gas/liquid, and a curved coupling pipe used for feeding gas or liquid at a high speed.

As described above, in the present invention, it is possible to significantly decrease an abrasion due to a collision between fluid materials which are fed at low speed and high pressure zones by forming a flow field such as a vortex flow field at a portion in which an abrasion is increased and a flow direction is changed, and it is possible to use the system for long time without maintenance. Thus, stopping time of the industrial facilities due to the maintenance is decreased, so that an economical loss is significantly decreased. In addition, it is possible to decrease any abrasion without lining a protection film and increasing the thickness of a pipe wall at the flow direction changing portion, so that the fabrication cost is decreased. In the present invention, even when a flow field is formed at the flow direction changing portion, since the fluids are not accumulated, the flow loss does not occur, so that a good efficiency of the fluid feed pipe is obtained.

Although the preferred embodiment of the present invention have been disclosed for illustrative purposes, those skilled in the art will appreciate that various modifications, additions and substitutions are possible, without departing from the scope and spirit of the invention as recited in the accompanying claims.

What is claimed is:
1. An anti-abrasion pipe fitting for high speed particle-laden flow, having a curved T-shape, and comprising:
    a first upstream straight portion;
    a downstream straight portion extended on the same axis with respect to the first upstream straight portion;
    a second upstream straight portion formed at a certain angle with respect to the first upstream straight portion and downstream straight portion;
    an upstream flow direction changing portion formed between the first upstream straight portion and the second upstream straight portion;
    a downstream flow direction changing portion formed between the second upstream straight portion and the downstream straight portion; and
    a connection portion connecting the first upstream straight portion and the downstream straight portion, wherein the upstream flow direction changing portion is formed with a standard flow range, and the downstream flow direction changing portion is enlarged to the outside of the standard flow range so as to form a vortex flow field during a fluid feed.
2. The pipe fitting of claim 1, wherein a curved recess is formed in an inner surface of the connection portion proximate the juncture of the second upstream straight portion for thereby forming a plurality of flow fields through the connection portion during a fluid feed.

3. An anti-abrasion pipe fitting for high speed particle-laden flow, having a curved Y-shape, and comprising:

a first upstream straight portion;

a downstream straight portion extended on the same axis with respect to the upstream straight portion;

a second upstream straight portion formed at a certain angle less than 90° with respect to the first upstream straight portion and downstream straight portion, an upstream flow direction changing portion formed between the first upstream straight portion and the second upstream straight portion;

a downstream flow direction changing portion formed between the second upstream straight portion and the downstream straight portion; and a connection portion connecting the first upstream straight portion and the downstream straight portion, wherein the upstream flow direction changing portion is formed with a standard flow range, and the downstream flow direction changing portion is enlarged to the outside of the standard flow range so as to form a vortex flow field during a fluid feed.

4. The pipe fitting of claim 3, wherein a curved recess is formed in an inner surface of the connection portion proximate the juncture of the second upstream straight portion for thereby forming a vortex field through the connection portion during a fluid feed by expanding the diameter of the pipe.

* * * * *